(12) United States Patent
Zhang et al.

(10) Patent No.: US 11,222,231 B2
(45) Date of Patent: Jan. 11, 2022

(54) TARGET MATCHING METHOD AND APPARATUS, ELECTRONIC DEVICE, AND STORAGE MEDIUM

(71) Applicant: SHENZHEN SENSETIME TECHNOLOGY CO., LTD., Shenzhen (CN)

(72) Inventors: Ruimao Zhang, Shenzhen (CN); Hongbin Sun, Shenzhen (CN); Ping Luo, Shenzhen (CN); Yuying Ge, Shenzhen (CN); Kuanze Ren, Shenzhen (CN); Liang Lin, Shenzhen (CN); Xiaogang Wang, Shenzhen (CN)

(73) Assignee: SHENZHEN SENSETIME TECHNOLOGY CO., LTD., Shenzhen (CN)

(*) Notice: Subject to any disclaimer, the term of this patent is extended or adjusted under 35 U.S.C. 154(b) by 164 days.

(21) Appl. No.: 16/841,723

(22) Filed: Apr. 7, 2020

(65) Prior Publication Data
US 2020/0234078 A1 Jul. 23, 2020

Related U.S. Application Data

(63) Continuation of application No. PCT/CN2019/086670, filed on May 13, 2019.

(30) Foreign Application Priority Data

Jun. 15, 2018 (CN) .......................... 201810621959.5

(51) Int. Cl.
*G06K 9/62* (2006.01)
*G06F 16/532* (2019.01)
(Continued)

(52) U.S. Cl.
CPC .......... *G06K 9/6215* (2013.01); *G06F 16/532* (2019.01); *G06F 16/56* (2019.01);
(Continued)

(58) Field of Classification Search
CPC .......... G06N 3/04; G06K 9/6217; G06K 9/46; G06K 9/6215; G06F 16/56; G06F 16/532
See application file for complete search history.

(56) References Cited

U.S. PATENT DOCUMENTS 7,921,036 B1 * 4/2011 Sharma ................. G06Q 30/02
705/14.66
2016/0171346 A1 6/2016 Han et al.
(Continued)

FOREIGN PATENT DOCUMENTS

CN   105608234 A   5/2016
CN   106326288 A   1/2017
(Continued)

OTHER PUBLICATIONS

Zhang et al. "SCAN: Self and Collaborative Attention Network for Video Person Re-identification" IEEE Transactions on Image Processing Aug. 6, 2019—pp. 1-13.*
(Continued)

*Primary Examiner* — Mia M Thomas
(74) *Attorney, Agent, or Firm* — Cooper Legal Group, LLC

(57) ABSTRACT

Target matching method and apparatus, electronic device, and storage medium, including: extracting feature vector of each frame in query image sequence and feature vector of each frame in candidate image sequence; determining self-expression feature vector of query image sequence, collaborative expression feature vector of the query image sequence, self-expression feature vector of candidate image sequence, and collaborative expression feature vector of
(Continued)

candidate image sequence based on feature vector of each frame in query image sequence and feature vector of each frame in candidate image sequence; determining similarity feature vector between query image sequence and candidate image sequence based on self-expression feature vector of query image sequence, collaborative expression feature vector of query image sequence, self-expression feature vector of candidate image sequence, and collaborative expression feature vector of candidate image sequence; and determining matching result between query image sequence and candidate image sequence based on similarity feature vector.

20 Claims, 11 Drawing Sheets

(51) Int. Cl.
  *G06F 16/56* (2019.01)
  *G06K 9/46* (2006.01)
  *G06N 3/04* (2006.01)
(52) U.S. Cl.
  CPC .............. *G06K 9/46* (2013.01); *G06K 9/6217* (2013.01); *G06N 3/04* (2013.01)

(56) References Cited

U.S. PATENT DOCUMENTS

2017/0308909 A1* 10/2017 Faith .................. G06K 9/00315
2021/0264496 A1*  8/2021 Claros .................... G06F 17/16

FOREIGN PATENT DOCUMENTS

| CN | 106649663 A | 5/2017 |
| CN | 106886599 A | 6/2017 |
| CN | 107193983 A | 9/2017 |
| CN | 107451156 A | 12/2017 |
| CN | 107862331 A | 3/2018 |
| CN | 109145150 A | 1/2019 |

OTHER PUBLICATIONS

International Search Report in the international application No. PCT/CN2019/086670, dated Aug. 15, 2019, 2 pgs.
"SCAN: Self-and-Collaborative Attention Networkfor Video Person Re-identification"; Aug. 2019; Ruimao Zheng, Jinguy Il, Hongbin Sun, Yuying Ge, Ping Luo, Xiaogang Wang and Liang Lin; IEEE Transactions on Image Processing; Reprinted from the Internet at: https://arxiv.org/pdf/1807.05688.pdf, 13 pgs.
First Office Action of the Chinese application No. 201810621959.5, dated May 25, 2020, 18 pgs.
"Image-to-Video Person Re-Identification With Temporally Memorized Similarity Learning", Jul. 2017, Dongyu Zhang, Wenxi Wu, Hui Chent, Ruimao Zhang,Zhanjiang Dong and Zhaoquan Cai, IEEE Transactions on Circuits and Systems for Video Technology, IEEE, vol. 28, Issue: 10, Reprinted from the Internet at: https://ieeexplore.ieee.org/stamp/stamp.jsp?tp=&arumber=7968366, 11 pgs.
First Office Action of the Korean application No. 10-2020-7007917, dated May 29, 2021,6 pgs.
English translation of the Written Opinion of the International Search Authority in the International application No. PCT/CN2019/086670, dated Aug. 15, 2019, 5 pgs.

* cited by examiner

TARGET MATCHING METHOD AND APPARATUS, ELECTRONIC DEVICE, AND STORAGE MEDIUM

CROSS-REFERENCE TO RELATED APPLICATION

The present disclosure is a U.S. continuation application of International Application No. PCT/CN2019/086670, filed on May 13, 2019, which claims priority to Chinese Patent Application No. 201810621959.5, filed with the Chinese Patent Office on Jun. 15, 2018 and entitled "TARGET MATCHING METHOD AND APPARATUS, ELECTRONIC DEVICE, AND STORAGE MEDIUM". The disclosures of International Application No. PCT/CN2019/086670 and Chinese Patent Application No. 201810621959.5 are incorporated herein by reference in their entireties.

BACKGROUND

Target matching refers to returning a video or an image, which has the same target as a query video or a query image, in a database. Target matching technology is widely used in security monitoring systems at airports, stations, schools, shopping malls, and the like.

SUMMARY

The present disclosure relates to the field of computer vision technologies, and in particular, to a target matching method and apparatus, an electronic device, and a storage medium.

The present disclosure provides a target matching technical solution.

According to one aspect of the present disclosure, a target matching method is provided, including:

respectively extracting a feature vector of each frame in a query image sequence and a feature vector of each frame in a candidate image sequence, where the query image sequence includes a target to be matched;

determining a self-expression feature vector of the query image sequence based on the feature vector of each frame in the query image sequence, and determining a self-expression feature vector of the candidate image sequence based on the feature vector of each frame in the candidate image sequence;

determining a collaborative expression feature vector of the query image sequence based on the feature vector of each frame in the query image sequence and the self-expression feature vector of the candidate image sequence, and determining a collaborative expression feature vector of the candidate image sequence based on the feature vector of each frame in the candidate image sequence and the self-expression feature vector of the query image sequence;

determining a similarity feature vector between the query image sequence and the candidate image sequence based on the self-expression feature vector of the query image sequence, the collaborative expression feature vector of the query image sequence, the self-expression feature vector of the candidate image sequence, and the collaborative expression feature vector of the candidate image sequence; and determining a matching result between the query image sequence and the candidate image sequence based on the similarity feature vector.

According to one aspect of the present disclosure, a target matching apparatus is provided, including:

an extraction module, configured to respectively extract a feature vector of each frame in a query image sequence and a feature vector of each frame in a candidate image sequence, where the query image sequence includes a target to be matched;

a first determination module, configured to respectively determine a self-expression feature vector of the query image sequence based on the feature vector of each frame in the query image sequence, and determine a self-expression feature vector of the candidate image sequence based on the feature vector of each frame in the candidate image sequence;

a second determination module, configured to determine a collaborative expression feature vector of the query image sequence based on the feature vector of each frame in the query image sequence and the self-expression feature vector of the candidate image sequence, and determine a collaborative expression feature vector of the candidate image sequence based on the feature vector of each frame in the candidate image sequence and the self-expression feature vector of the query image sequence;

a third determination module, configured to determine a similarity feature vector between the query image sequence and the candidate image sequence based on the self-expression feature vector of the query image sequence, the collaborative expression feature vector of the query image sequence, the self-expression feature vector of the candidate image sequence, and the collaborative expression feature vector of the candidate image sequence; and a fourth determination module, configured to determine a matching result between the query image sequence and the candidate image sequence based on the similarity feature vector.

According to one aspect of the present disclosure, an electronic device is provided, including:

a processor; and a memory configured to store processor-executable instructions;

where when the processor-executable instructions are executed by the processor, the processor is configured to execute the foregoing target matching method.

According to one aspect of the present disclosure, a non-transitory computer-readable storage medium is provided, having computer program instructions stored thereon, where the foregoing target matching method is implemented when the computer program instructions are executed by a processor.

Exemplary embodiments are described in detail below according to the following reference accompanying drawings, and other features and aspects of the present disclosure become clear.

BRIEF DESCRIPTION OF THE ACCOMPANYING DRAWINGS

Accompanying drawings included in the description and constructing a part of the description jointly show the exemplary embodiments, features, and aspects of the present disclosure, and are intended to explain the principles of the present disclosure.

DETAILED DESCRIPTION

Figure 1:
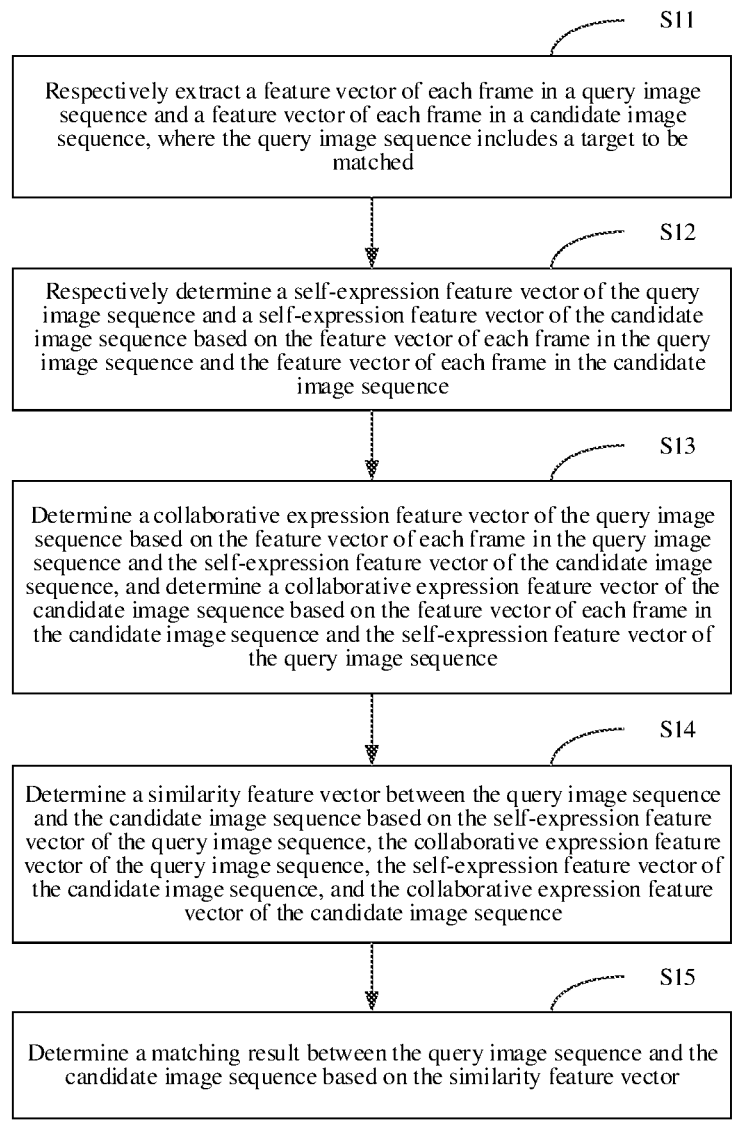
FIG. 1 is a flowchart of a target matching method according to embodiments of the present disclosure.

In related art, the accuracy of target matching is low. In embodiments of the present disclosure, by determining a similarity feature vector between a query image sequence and a candidate image sequence based on a self-expression feature vector of the query image sequence, a collaborative expression feature vector of the query image sequence, a self-expression feature vector of the candidate image sequence, and a collaborative expression feature vector of the candidate image sequence, and determining a matching result between the query image sequence and the candidate image sequence based on the similarity feature vector, the accuracy of target matching can be improved.

The following describes various exemplary embodiments, features, and aspects of the present disclosure in detail with reference to the accompanying drawings. Same reference numerals in the accompanying drawings represent elements with same or similar functions. Although various aspects of the embodiments are illustrated in the accompanying drawings, the accompanying drawings are not necessarily drawn in proportion unless otherwise specified.

The special term "exemplary" here refers to "being used as an example, an embodiment, or an illustration". Any embodiment described as "exemplary" here should not be explained as being more superior or better than other embodiments.

In addition, for better illustration of the present disclosure, various specific details are given in the following specific implementations. A person skilled in the art should understand that the present disclosure may also be implemented without the specific details. In some instances, methods, means, elements, and circuits well known to a person skilled in the art are not described in detail so as to highlight the subject matter of the present disclosure.

FIG. 1 is a flowchart of a target matching method according to embodiments of the present disclosure. The embodiments of the present disclosure may be applied in fields such as intelligent video analysis or security monitoring. For example, the embodiments of the present disclosure may be combined with technologies such as pedestrian detection and pedestrian tracking, and may be applied to security monitoring systems at airports, stations, schools, shopping malls, and the like. As shown in FIG. 1, the method includes operations S11 to S15.

At operation S11, a feature vector of each frame in a query image sequence and a feature vector of each frame in a candidate image sequence are respectively extracted, where the query image sequence includes a target to be matched.

In the embodiments of the present disclosure, the query image sequence may refer to an image sequence that requires target matching. The candidate image sequence may refer to an image sequence in a database. The database may include multiple candidate image sequences, for example, the database may include a large number of candidate image sequences. In the embodiments of the present disclosure, the query image sequence may include only one target to be matched, or may include multiple targets to be matched. The image sequence in the embodiments of the present disclosure may be a video, a video clip, or other image sequences.

In the embodiments of the present disclosure, the numbers of frames of the query image sequence and the candidate image sequence may be different or the same. For example, the query image sequence includes T frames (that is, the query image sequence includes T images), and the candidate image sequence includes R frames (that is, the candidate image sequence includes R images), where T and R are positive integers.

In the embodiments of the present disclosure, the feature vector of each frame in the query image sequence is extracted to obtain $X=\{x^t\}_{t=1}^{T}$, where $x^t$ represents the feature vector of the t-th frame in the query image sequence, and $1 \leq t \leq T$; the feature vector of each frame in the candidate image sequence is extracted to obtain $Y=\{y^r\}_{r=1}^{R}$, where $y^r$ represents the feature vector of the r-th frame in the candidate image sequence, and $1 \leq r \leq R$.

In a possible implementation, the respectively extracting a feature vector of each frame in a query image sequence and a feature vector of each frame in a candidate image sequence includes: extracting the feature vector of each frame in the query image sequence and the feature vector of each frame in the candidate image sequence by a first sub-neural network. For example, the first sub-neural network may be a Convolutional Neural Network (CNN). In this implementation, convolutional neural networks having the same parameters may be used for respectively extracting the feature vector of each frame in the query image sequence and the feature vector of each frame in the candidate image sequence.

In a possible implementation, after extracting the feature vector of each frame in the query image sequence and the feature vector of each frame in the candidate image sequence, the method further includes: performing dimension reduction on the feature vector of each frame in the query image sequence and the feature vector of each frame in the candidate image sequence by a first fully connected layer of the first sub-neural network to obtain a first dimension-reduced feature vector of each frame in the query image sequence and a first dimension-reduced feature vector of each frame in the candidate image sequence. For example, the first dimension-reduced feature vector of each frame in the query image sequence may be represented as $X_f=\{x_f^t\}_{t=1}^T$, where $x_f^t$ is the first dimension-reduced feature vector of the t-th frame in the query image sequence; the first dimension-reduced feature vector of each frame in the candidate image sequence may be represented as $Y_f=\{y_f^r\}_{r=1}^R$, where $y_f^r$ is the first dimension-reduced feature vector of the r-th frame in the candidate image sequence. For example, the number of dimensions of the feature vector of each frame in the query image sequence is 2048 dimensions, and the number of dimensions of the first dimension-reduced feature vector of each frame in the query image sequence is 128 dimensions; the number of dimensions of the feature vector of each frame in the candidate image sequence is 2048 dimensions, and the number of dimensions of the first dimension-reduced feature vector of each frame in the candidate image sequence is 128 dimensions. For example, the first fully connected layer may be denoted as fc-0.

At operation S12, a self-expression feature vector of the query image sequence and a self-expression feature vector of the candidate image sequence are respectively determined based on the feature vector of each frame in the query image sequence and the feature vector of each frame in the candidate image sequence.

In the embodiments of the present disclosure, the self-expression feature vector of the query image sequence may be determined based on the feature vector of each frame in the query image sequence; and the self-expression feature vector of the candidate image sequence may be determined based on the feature vector of each frame in the candidate image sequence. In the embodiments of the present disclosure, the self-expression feature vector of the query image sequence may represent a feature vector determined only by the expression of the query image sequence, that is, the self-expression feature vector of the query image sequence is determined only by the expression of the query image sequence, and is not related to the expression of the candidate image sequence; the self-expression feature vector of the candidate image sequence may represent a feature vector determined only by the expression of the candidate image sequence, that is, the self-expression feature vector of the candidate image sequence is determined only by the expression of the candidate image sequence, and is not related to the expression of the query image sequence.

At operation S13, a collaborative expression feature vector of the query image sequence is determined based on the feature vector of each frame in the query image sequence and the self-expression feature vector of the candidate image sequence and a collaborative expression feature vector of the candidate image sequence is determined based on the feature vector of each frame in the candidate image sequence and the self-expression feature vector of the query image sequence.

In the embodiments of the present disclosure, the collaborative expression feature vector of the query image sequence may represent a feature vector determined by both the expression of the query image sequence and the expression of the candidate image sequence, that is, the collaborative expression feature vector of the query image sequence is not only related to the expression of the query image sequence, but also related to the expression of the candidate image sequence; the collaborative expression feature vector of the candidate image sequence may represent a feature vector determined by both the expression of the candidate image sequence and the expression of the query image sequence, that is, the collaborative expression feature vector of the candidate image sequence is not only related to the expression of the candidate image sequence, but also related to the expression of the query image sequence.

At operation S14, a similarity feature vector between the query image sequence and the candidate image sequence is determined based on the self-expression feature vector of the query image sequence, the collaborative expression feature vector of the query image sequence, the self-expression feature vector of the candidate image sequence, and the collaborative expression feature vector of the candidate image sequence.

In the embodiments of the present disclosure, the similarity feature vector between the query image sequence and the candidate image sequence may be used for determining the degree of similarity between the query image sequence and the candidate image sequence, so as to determine whether the query image sequence matches the candidate image sequence.

At operation S15, a matching result between the query image sequence and the candidate image sequence is determined based on the similarity feature vector.

In the embodiments of the present disclosure, two matching image sequences may be image sequences of the same person captured from different photographing angles of view, or may be image sequences of the same person captured from the same photographing angle of view.

In the embodiments of the present disclosure, by determining a similarity feature vector between a query image sequence and a candidate image sequence based on a self-expression feature vector of the query image sequence, a collaborative expression feature vector of the query image sequence, a self-expression feature vector of the candidate image sequence, and a collaborative expression feature vector of the candidate image sequence, and determining a matching result between the query image sequence and the candidate image sequence based on the similarity feature vector, the accuracy of target matching can be improved.

Figure 2:
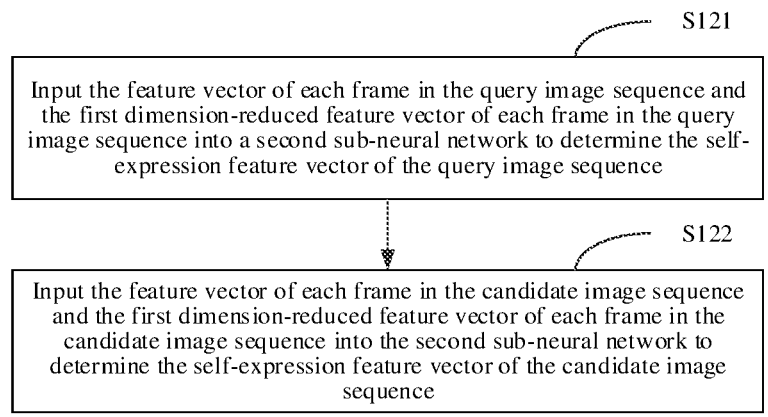
FIG. 2 is an exemplary flowchart of operation S12 in a target matching method according to embodiments of the present disclosure.

FIG. 2 is an exemplary flowchart of operation S12 in a target matching method according to embodiments of the present disclosure. As shown in FIG. 2, operation S12 may include operations S121 and S122.

At operation S121, the feature vector of each frame in the query image sequence and the first dimension-reduced feature vector of each frame in the query image sequence are input into a second sub-neural network to determine the self-expression feature vector of the query image sequence.

For example, the second sub-neural network may be a Self Attention Subnetwork (SAN, a self-expression sub-neural network based on the attention mechanism).

For example, the feature vector $X=\{x^t\}_{t=1}^T$ of each frame in the query image sequence and the first dimension-reduced feature vector $X_f=\{x_f^t\}_{t=1}^T$ of each frame in the query image sequence may be input into the second sub-neural network to determine the self-expression feature vector $\hat{x}_{xx}$ of the query image sequence.

At operation S122, the feature vector of each frame in the candidate image sequence and the first dimension-reduced feature vector of each frame in the candidate image sequence are input into the second sub-neural network to determine the self-expression feature vector of the candidate image sequence.

For example, the feature vector $Y=\{y^r\}_{r=1}^R$ of each frame in the candidate image sequence and the first dimension-reduced feature vector $Y_f=\{y_f^r\}_{r=1}^R$ of each frame in the candidate image sequence may be input into the second sub-neural network to determine the self-expression feature vector $\hat{y}_{yy}$ of the candidate image sequence.

Figure 3:
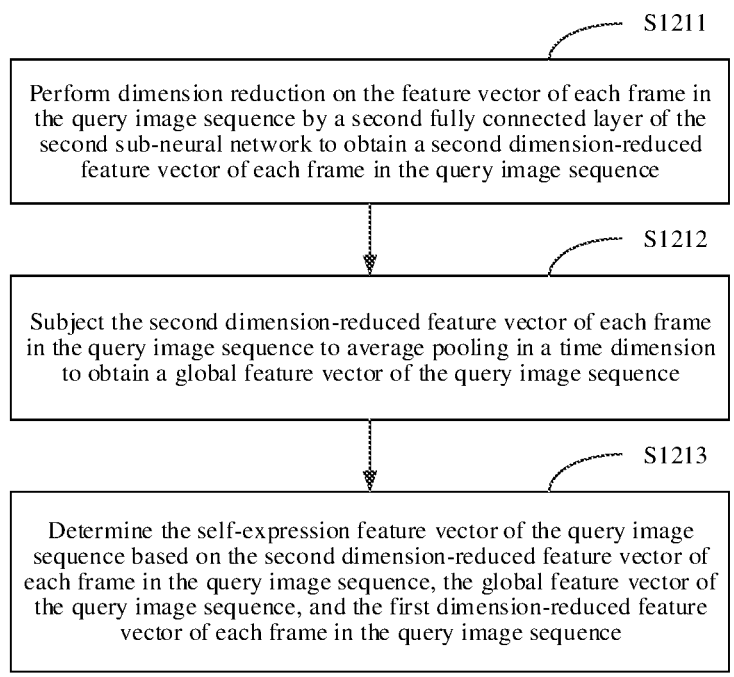
FIG. 3 is an exemplary flowchart of operation S121 in a target matching method according to embodiments of the present disclosure.

FIG. 3 is an exemplary flowchart of operation S121 in a target matching method according to embodiments of the present disclosure. As shown in FIG. 3, operation S121 may include operations S1211 to S1213.

At operation S1211, dimension reduction is performed on the feature vector of each frame in the query image sequence by a second fully connected layer of the second sub-neural network to obtain a second dimension-reduced feature vector of each frame in the query image sequence.

For example, the second dimension-reduced feature vector of each frame in the query image sequence may be represented as $X_s=\{x_s^t\}_{t=1}^T$, where $x_s^t$ is the second dimension-reduced feature vector of the t-th frame in the query image sequence.

For example, the second fully connected layer may be denoted as fc-1.

For example, the number of dimensions of the second dimension-reduced feature vector of each frame in the query image sequence is 128 dimensions.

At operation S1212, the second dimension-reduced feature vector of each frame in the query image sequence is subjected to average pooling in a time dimension to obtain a global feature vector of the query image sequence.

For example, the global feature vector of the query image sequence may be represented as $\hat{x}_s$.

At operation S1213, the self-expression feature vector of the query image sequence is determined based on the second dimension-reduced feature vector of each frame in the query image sequence, the global feature vector of the query image sequence, and the first dimension-reduced feature vector of each frame in the query image sequence.

Figure 4:
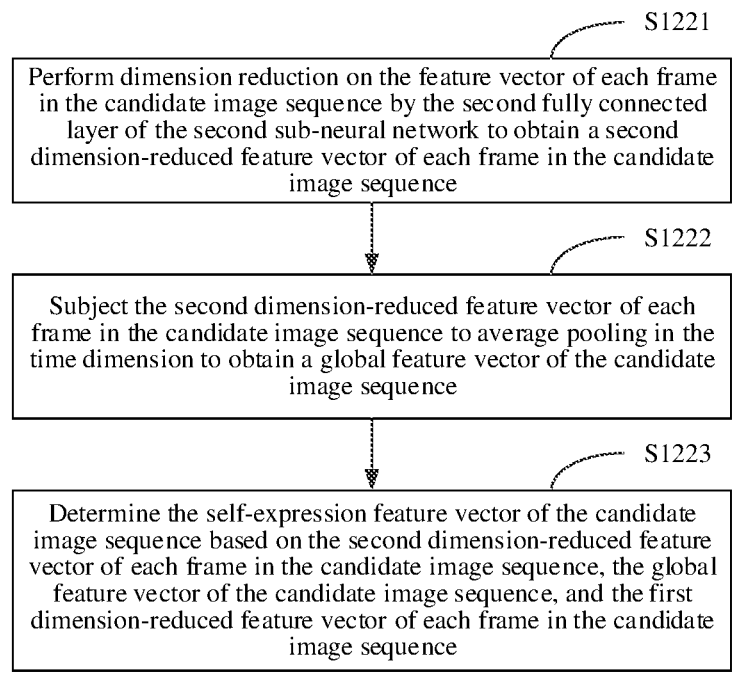
FIG. 4 is an exemplary flowchart of operation S122 in a target matching method according to embodiments of the present disclosure.

FIG. 4 is an exemplary flowchart of operation S122 in a target matching method according to embodiments of the present disclosure. As shown in FIG. 4, operation S122 may include operations S1221 to S1223.

At operation S1221, dimension reduction is performed on the feature vector of each frame in the candidate image sequence by the second fully connected layer of the second sub-neural network to obtain a second dimension-reduced feature vector of each frame in the candidate image sequence.

For example, the number of dimensions of the second dimension-reduced feature vector of each frame in the candidate image sequence is 128 dimensions.

At operation S1222, the second dimension-reduced feature vector of each frame in the candidate image sequence is subjected to average pooling in the time dimension to obtain a global feature vector of the candidate image sequence.

For example, the global feature vector of the candidate image sequence may be represented as $\hat{y}_s$.

At operation S1223, the self-expression feature vector of the candidate image sequence is determined based on the second dimension-reduced feature vector of each frame in the candidate image sequence, the global feature vector of the candidate image sequence, and the first dimension-reduced feature vector of each frame in the candidate image sequence.

Figure 5:
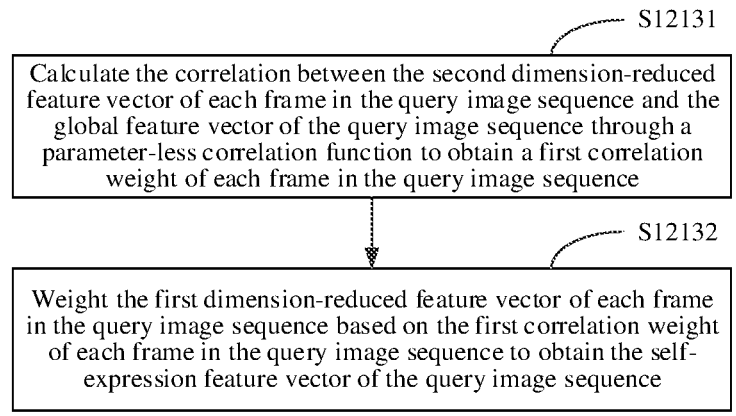
FIG. 5 is an exemplary flowchart of operation S1213 in a target matching method according to embodiments of the present disclosure.

FIG. 5 is an exemplary flowchart of operation S1213 in a target matching method according to embodiments of the present disclosure. As shown in FIG. 5, operation S1213 may include operations S12131 and S12132.

At operation S12131, the correlation between the second dimension-reduced feature vector of each frame in the query image sequence and the global feature vector of the query image sequence is calculated through a parameter-less correlation function to obtain a first correlation weight of each frame in the query image sequence.

For example, the correlation between the second dimension-reduced feature vector of each frame in the query image sequence and the global feature vector of the query image sequence may be calculated through a parameter-less correlation function $f(\ )$ to obtain a first correlation weight $f(x_s^t, \hat{x}_s)$ of each frame in the query image sequence.

In a possible implementation, the correlation between $x_s^t$ and $\hat{x}_s$ may be calculated through the parameter-less correlation function $f(\ )$ by means of dot multiplication.

In the embodiments of the present disclosure, based on a self-expression mechanism, a correlation weight is assigned to each frame of the query image sequence through self-expression of the query image sequence.

At operation S12132, the first dimension-reduced feature vector of each frame in the query image sequence is weighted based on the first correlation weight of each frame in the query image sequence to obtain the self-expression feature vector of the query image sequence.

For example, the self-expression feature vector of the query image sequence may be represented as $$\hat{x}_{xx} = \sum_{t=1}^{T} f(x_s^t, \hat{x}_s) x_f^t,$$

where $x_s^t$ represents the second dimension-reduced feature vector of the t-th frame in the query image sequence, $\hat{x}_s$ represents the global feature vector of the query image sequence, and $x_f^t$ represents the first dimension-reduced feature vector of the t-th frame in the query image sequence.

In a possible implementation, the first correlation weight includes a first normalized correlation weight, the first normalized correlation weight being obtained by normalizing the first correlation weight. In this implementation, the weighting the first dimension-reduced feature vector of each frame in the query image sequence based on the first correlation weight of each frame in the query image sequence to obtain the self-expression feature vector of the query image sequence includes: normalizing the first correlation weight of each frame in the query image sequence to obtain the first normalized correlation weight of each frame in the query image sequence; and weighting the first dimension-reduced feature vector of each frame in the query image sequence based on the first normalized correlation weight of each frame in the query image sequence to obtain the self-expression feature vector of the query image sequence.

In this implementation, the first correlation weight of each frame in the query image sequence may be normalized by softmax to obtain the first normalized correlation weight of each frame in the query image sequence.

Figure 6:
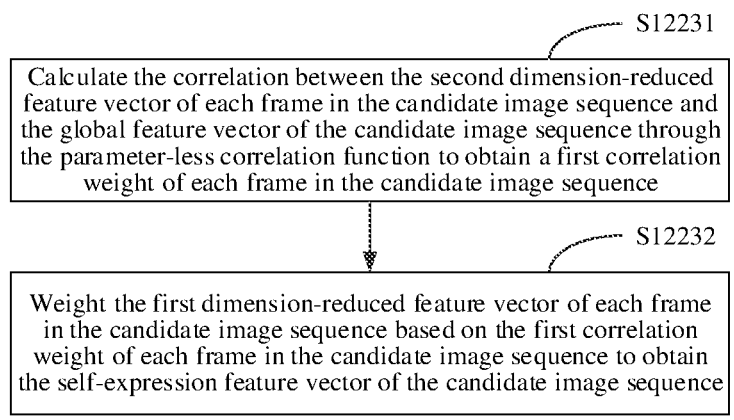
FIG. 6 is an exemplary flowchart of operation S1223 in a target matching method according to embodiments of the present disclosure.

FIG. 6 is an exemplary flowchart of operation S1223 in a target matching method according to embodiments of the present disclosure. As shown in FIG. 6, operation S1223 may include operations S12231 and S12232.

At operation S12231, the correlation between the second dimension-reduced feature vector of each frame in the candidate image sequence and the global feature vector of the candidate image sequence is calculated through the parameter-less correlation function to obtain a first correlation weight of each frame in the candidate image sequence.

For example, the correlation between the second dimension-reduced feature vector of each frame in the candidate image sequence and the global feature vector of the candidate image sequence may be calculated through a parameter-less correlation function $f(\ )$ to obtain a first correlation weight $f(y_s^r, \hat{y}_s)$ of each frame in the candidate image sequence.

In a possible implementation, the correlation between $y_s^r$ and $\hat{y}_s$ may be calculated through the parameter-less correlation function $f(\ )$ by means of dot multiplication.

In the embodiments of the present disclosure, based on the self-expression mechanism, a correlation weight is assigned to each frame of the candidate image sequence through self-expression of the candidate image sequence.

At operation S12232, the first dimension-reduced feature vector of each frame in the candidate image sequence is weighted based on the first correlation weight of each frame in the candidate image sequence to obtain the self-expression feature vector of the candidate image sequence.

For example, the self-expression feature vector of the candidate image sequence may be represented as $$\hat{y}_{yy} = \sum_{r=1}^{R} f(y_s^r, \hat{y}_s) y_f^r,$$

where $y_s^r$ represents the second dimension-reduced feature vector of the r-th frame in the candidate image sequence, $\hat{y}_s$ represents the global feature vector of the candidate image sequence, and $y_f^r$ represents the first dimension-reduced feature vector of the r-th frame in the candidate image sequence.

In a possible implementation, the first correlation weight includes a first normalized correlation weight, the first normalized correlation weight being obtained by normalizing the first correlation weight. In this implementation, the weighting the first dimension-reduced feature vector of each frame in the candidate image sequence based on the first correlation weight of each frame in the candidate image sequence to obtain the self-expression feature vector of the candidate image sequence includes: normalizing the first correlation weight of each frame in the candidate image sequence to obtain the first normalized correlation weight of each frame in the candidate image sequence; and weighting the first dimension-reduced feature vector of each frame in the candidate image sequence based on the first normalized correlation weight of each frame in the candidate image sequence to obtain the self-expression feature vector of the candidate image sequence. In this implementation, the first correlation weight of each frame in the candidate image sequence may be normalized by softmax to obtain the first normalized correlation weight of each frame in the candidate image sequence.

Figure 7:
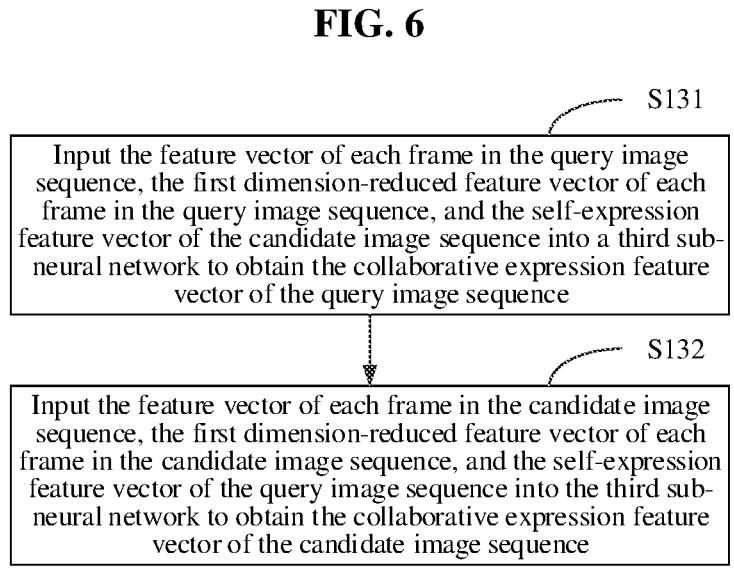
FIG. 7 is an exemplary flowchart of operation S13 in a target matching method according to embodiments of the present disclosure.

FIG. 7 is an exemplary flowchart of operation S13 in a target matching method according to embodiments of the present disclosure. As shown in FIG. 7, operation S13 may include operations S131 and S132.

At operation S131, the feature vector of each frame in the query image sequence, the first dimension-reduced feature vector of each frame in the query image sequence, and the self-expression feature vector of the candidate image sequence are input into a third sub-neural network to obtain the collaborative expression feature vector of the query image sequence.

For example, the third sub-neural network may be a Collaborative Attention Subnetwork (CAN, a collaborative expression sub-neural network based on the attention mechanism).

For example, the feature vector $X=\{x^t\}_{t=1}^{T}$ of each frame in the query image sequence, the first dimension-reduced feature vector $X_f=\{x_f^t\}_{t=1}^{T}$ of each frame in the query image sequence, and the self-expression feature vector $$\hat{y}_{yy} = \sum_{r=1}^{R} f(y_s^r, \hat{y}_s) y_f^r$$

of the candidate image sequence are input into the third sub-neural network to obtain the collaborative expression feature vector $\hat{x}_{yx}$ of the query image sequence.

At operation S132, the feature vector of each frame in the candidate image sequence, the first dimension-reduced feature vector of each frame in the candidate image sequence, and the self-expression feature vector of the query image sequence are input into the third sub-neural network to obtain the collaborative expression feature vector of the candidate image sequence.

For example, the feature vector $Y=\{y^r\}_{r=1}^{R}$ of each frame in the candidate image sequence, the first dimension-reduced feature vector $Y_f=\{y_f^r\}_{r=1}^{R}$ of each frame in the candidate image sequence, and the self-expression feature vector $$\hat{x}_{xx} = \sum_{t=1}^{T} f(x_s^t, \hat{x}_s) x_f^t$$

of the query image sequence are input into the third sub-neural network to obtain the collaborative expression feature vector $\hat{y}_{xy}$ of the query image sequence.

Figure 8:
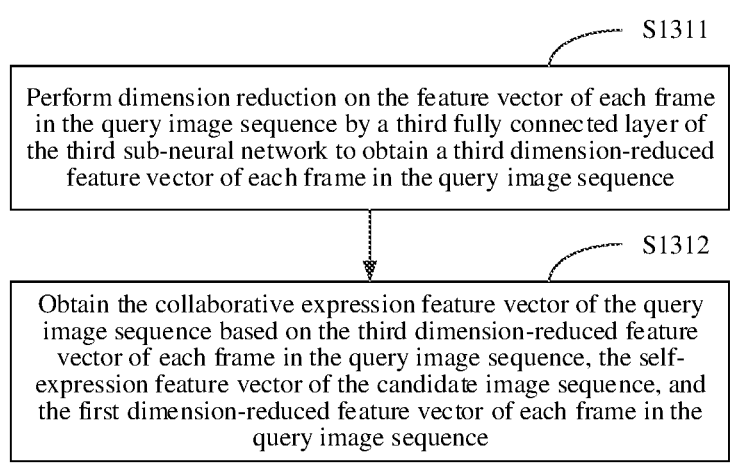
FIG. 8 is an exemplary flowchart of operation S131 in a target matching method according to embodiments of the present disclosure.

FIG. 8 is an exemplary flowchart of operation S131 in a target matching method according to embodiments of the present disclosure. As shown in FIG. 8, operations S131 may include operations S1311 and S1312.

At operation S1311, dimension reduction is performed on the feature vector of each frame in the query image sequence by a third fully connected layer of the third sub-neural network to obtain a third dimension-reduced feature vector of each frame in the query image sequence.

For example, the third dimension-reduced feature vector of each frame in the query image sequence may be represented as $X_c=\{x_c^t\}_{t=1}^{T}$, where $x_c^t$ is the third dimension-reduced feature vector of the t-th frame in the query image sequence. For example, the number of dimensions of the third dimension-reduced feature vector of each frame in the query image sequence is 128 dimensions.

For example, the third fully connected layer may be denoted as fc-2.

At operation S1312, the collaborative expression feature vector of the query image sequence is obtained based on the third dimension-reduced feature vector of each frame in the query image sequence, the self-expression feature vector of the candidate image sequence, and the first dimension-reduced feature vector of each frame in the query image sequence.

Figure 9:
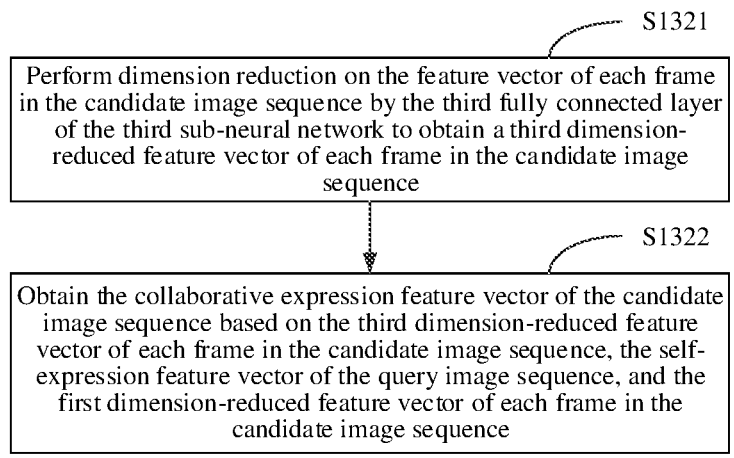
FIG. 9 is an exemplary flowchart of operation S132 in a target matching method according to embodiments of the present disclosure.

FIG. 9 is an exemplary flowchart of operation S132 in a target matching method according to embodiments of the present disclosure. As shown in FIG. 9, operation S132 may include operations S1321 and S1322.

At operation S1321, dimension reduction is performed on the feature vector of each frame in the candidate image sequence by the third fully connected layer of the third sub-neural network to obtain a third dimension-reduced feature vector of each frame in the candidate image sequence.

For example, the third dimension-reduced feature vector of each frame in the candidate image sequence may be represented as $Y_c = \{y_c^r\}_{r=1}^R$, where $y_c^r$ is the third dimension-reduced feature vector of the r-th frame in the candidate image sequence. For example, the number of dimensions of the third dimension-reduced feature vector of each frame in the candidate image sequence is 128 dimensions.

At operation S1322, the collaborative expression feature vector of the candidate image sequence is obtained based on the third dimension-reduced feature vector of each frame in the candidate image sequence, the self-expression feature vector of the query image sequence, and the first dimension-reduced feature vector of each frame in the candidate image sequence.

Figure 10:
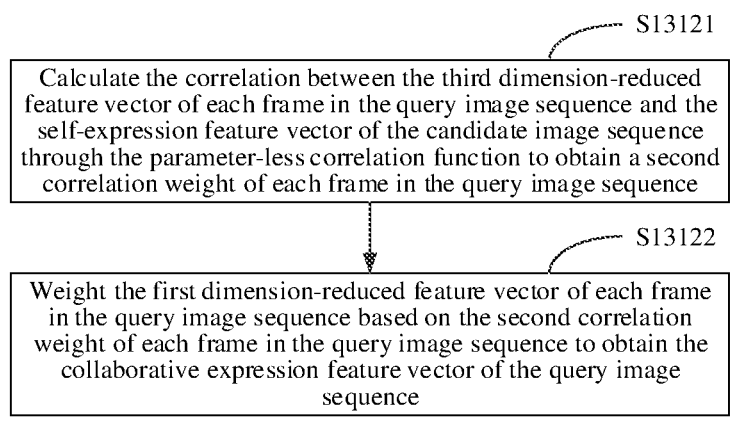
FIG. 10 is an exemplary flowchart of operation S1312 in a target matching method according to embodiments of the present disclosure.

FIG. 10 is an exemplary flowchart of operation S1312 in a target matching method according to embodiments of the present disclosure. As shown in FIG. 10, operation S1312 may include operations S13121 and S13122.

At operation S13121, the correlation between the third dimension-reduced feature vector of each frame in the query image sequence and the self-expression feature vector of the candidate image sequence is calculated through the parameter-less correlation function to obtain a second correlation weight of each frame in the query image sequence.

For example, the second correlation weight of the t-th frame in the query image sequence) may be represented as $f(x_c^t, \hat{y}_{yy})$.

In the embodiments of the present disclosure, based on a collaborative expression mechanism, a correlation weight is assigned to each frame of the query image sequence through expression of the candidate image sequence and self-expression of the query image sequence.

At operation S13122, the first dimension-reduced feature vector of each frame in the query image sequence is weighted based on the second correlation weight of each frame in the query image sequence to obtain the collaborative expression feature vector of the query image sequence.

For example, the collaborative expression feature vector of the query image sequence may be represented as $$\hat{x}_{yx} = \sum_{t=1}^{T} f(x_c^t, \hat{y}_{yy}) x_f^t.$$

In a possible implementation, the second correlation weight includes a second normalized correlation weight, the second normalized correlation weight being obtained by normalizing the second correlation weight. In this implementation, the weighting the first dimension-reduced feature vector of each frame in the query image sequence based on the second correlation weight of each frame in the query image sequence to obtain the collaborative expression feature vector of the query image sequence includes: normalizing the second correlation weight of each frame in the query image sequence to obtain the second normalized correlation weight of each frame in the query image sequence; and weighting the first dimension-reduced feature vector of each frame in the query image sequence based on the second normalized correlation weight of each frame in the query image sequence to obtain the collaborative expression feature vector of the query image sequence.

Figure 11:
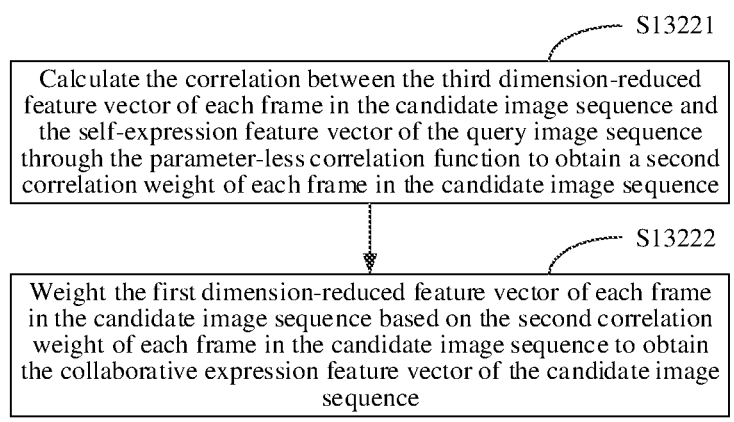
FIG. 11 is an exemplary flowchart of operation S1322 in a target matching method according to embodiments of the present disclosure.

FIG. 11 is an exemplary flowchart of operation S1322 in a target matching method according to embodiments of the present disclosure. As shown in FIG. 11, operation S1322 may include operations S13221 and S13222.

At operation S13221, the correlation between the third dimension-reduced feature vector of each frame in the candidate image sequence and the self-expression feature vector of the query image sequence is calculated through the parameter-less correlation function to obtain a second correlation weight of each frame in the candidate image sequence.

For example, the second correlation weight of the r-th frame in the candidate image sequence may be represented as $f(y_c^r, \hat{x}_{xx})$.

In the embodiments of the present disclosure, based on the collaborative expression mechanism, a correlation weight is assigned to each frame of the candidate image sequence through expression of the query image sequence and self-expression of the candidate image sequence.

At operation S13222, the first dimension-reduced feature vector of each frame in the candidate image sequence is weighted based on the second correlation weight of each frame in the candidate image sequence to obtain the collaborative expression feature vector of the candidate image sequence.

For example, the collaborative expression feature vector of the candidate image sequence may be represented as $$\hat{y}_{xy} = \sum_{r=1}^{R} f(y_c^r, \hat{x}_{xx}) y_f^r.$$

In a possible implementation, the second correlation weight includes a second normalized correlation weight, the second normalized correlation weight being obtained by normalizing the second correlation weight. In this implementation, the weighting the first dimension-reduced feature vector of each frame in the candidate image sequence based on the second correlation weight of each frame in the candidate image sequence to obtain the collaborative expression feature vector of the candidate image sequence includes: normalizing the second correlation weight of each frame in the candidate image sequence to obtain the second normalized correlation weight of each frame in the candidate image sequence; and weighting the first dimension-reduced feature vector of each frame in the candidate image sequence based on the second normalized correlation weight of each frame in the candidate image sequence to obtain the collaborative expression feature vector of the candidate image sequence.

In the embodiments of the present disclosure, the second sub-neural network and the third sub-neural network assign correlation weights to each frame of the query image sequence and each frame of the candidate image sequence through the expression of the query image sequence and the expression of the candidate image sequence based on the self-expression mechanism and the collaborative expression mechanism. The second sub-neural network and the third sub-neural network implicitly perform frame alignment on the query image sequence and the candidate image sequence by means of the non-parametric self-expression and collaborative expression, so as to select more discriminative frames to express the two image sequences. Since the second sub-neural network and the third sub-neural network are non-parametric, the query image sequence and the candidate image sequence are allowed to have different lengths. Therefore, the target matching method provided by the embodiments of the present disclosure has high flexibility and can be widely applied.

Figure 12:
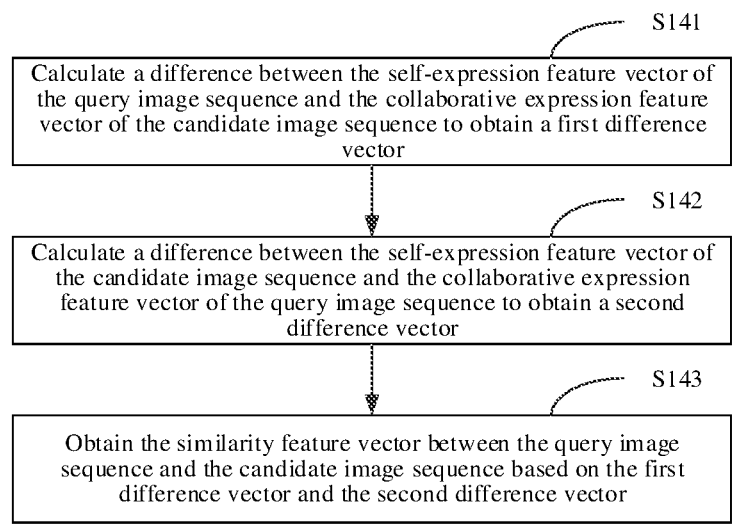
FIG. 12 is an exemplary flowchart of operation S14 in a target matching method according to embodiments of the present disclosure.

FIG. 12 is an exemplary flowchart of operation S14 in a target matching method according to embodiments of the present disclosure. As shown in FIG. 12, operation S14 may include operations S141 to S143.

At operation S141, a difference between the self-expression feature vector of the query image sequence and the collaborative expression feature vector of the candidate image sequence is calculated to obtain a first difference vector.

For example, the first difference vector is $\hat{x}_{xx}-\hat{y}_{xy}$.

At operation S142, a difference between the self-expression feature vector of the candidate image sequence and the collaborative expression feature vector of the query image sequence is calculated to obtain a second difference vector.

For example, the second difference vector is $\hat{y}_{yy}-\hat{x}_{yx}$.

At operation S143, the similarity feature vector between the query image sequence and the candidate image sequence are obtained based on the first difference vector and the second difference vector.

In a possible implementation, the obtaining the similarity feature vector between the query image sequence and the candidate image sequence based on the first difference vector and the second difference vector includes: calculating a sum of the first difference vector and the second difference vector to obtain the similarity feature vector between the query image sequence and the candidate image sequence. For example, the similarity feature vector between the query image sequence and the candidate image sequence is $s=(\hat{x}_{xx}-\hat{y}_{xy})+(\hat{y}_{yy}-\hat{x}_{yx})$.

In another possible implementation, the obtaining the similarity feature vector between the query image sequence and the candidate image sequence based on the first difference vector and the second difference vector includes: calculating a product of elements of corresponding bits of the first difference vector and the second difference vector to obtain the similarity feature vector between the query image sequence and the candidate image sequence.

Figure 13:
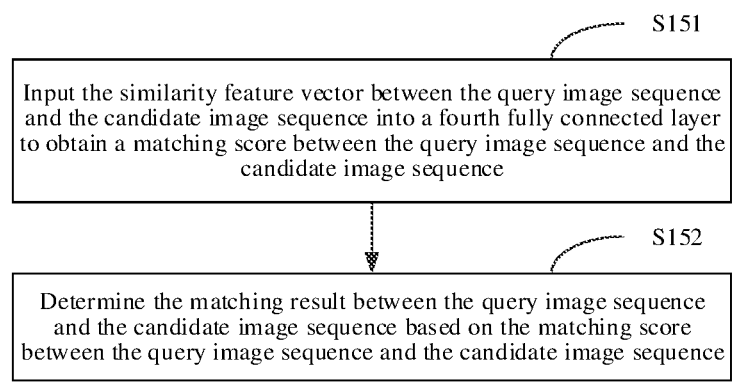
FIG. 13 is an exemplary flowchart of operation S15 in a target matching method according to embodiments of the present disclosure.

FIG. 13 is an exemplary flowchart of operation S15 in a target matching method according to embodiments of the present disclosure. As shown in FIG. 13, operation S15 may include operations S151 and S152.

At operation S151, the similarity feature vector between the query image sequence and the candidate image sequence is input into a fourth fully connected layer to obtain a matching score between the query image sequence and the candidate image sequence.

For example, the fourth fully connected layer may be denoted as fc-3.

It should be noted that the parameters of different fully connected layers in the embodiments of the present disclosure may be different. The "first", "second", "third", and "fourth" in the first fully connected layer, the second fully connected layer, the third fully connected layer, and the fourth fully connected layer are for convenience of expression and reference only, and indicates that the four fully connected layers may be different fully connected layers. The "first", "second", "third" and "fourth" are not used for limiting the order in which the fully connected layers are connected.

At operation S152, the matching result between the query image sequence and the candidate image sequence is determined based on the matching score between the query image sequence and the candidate image sequence.

For example, if the matching score between the query image sequence and the candidate image sequence is greater than a score threshold, it may be determined that the matching result between the query image sequence and the candidate image sequence is that the query image sequence matches the candidate image sequence; if the matching score between the query image sequence and the candidate image sequence is less than or equal to the score threshold, it may be determined that the matching result between the query image sequence and the candidate image sequence is that the query image sequence does not match the candidate image sequence.

In a possible implementation, after obtaining the matching score between the query image sequence and the candidate image sequence, the method further includes: optimizing network parameters by using the same pair of labeled data and a binary cross-entropy loss function based on the matching score between the query image sequence and the candidate image sequence.

As an example of this implementation, network parameters may be optimized by $$L = -\frac{1}{N}\sum_{i=1}^{N}[l_i \log m_i + (1-l_i)\log(1-m_i)],$$

where N represents the number of query image sequences and candidate image sequence pairs in a training set, and $m_i$ represents the matching score of the i-th pair. If the i-th query image sequence and candidate image sequence pair relates to the same person, then, $l_i=1$, otherwise, $l_i=0$.

In the embodiments of the present disclosure, during the training process, the training image sequence may be segmented to generate plenty of query image sequence and candidate image sequence pairs, so as to effectively improve the optimization efficiency and improve the robustness of the network model, thereby improving the matching accuracy.

Figure 14:
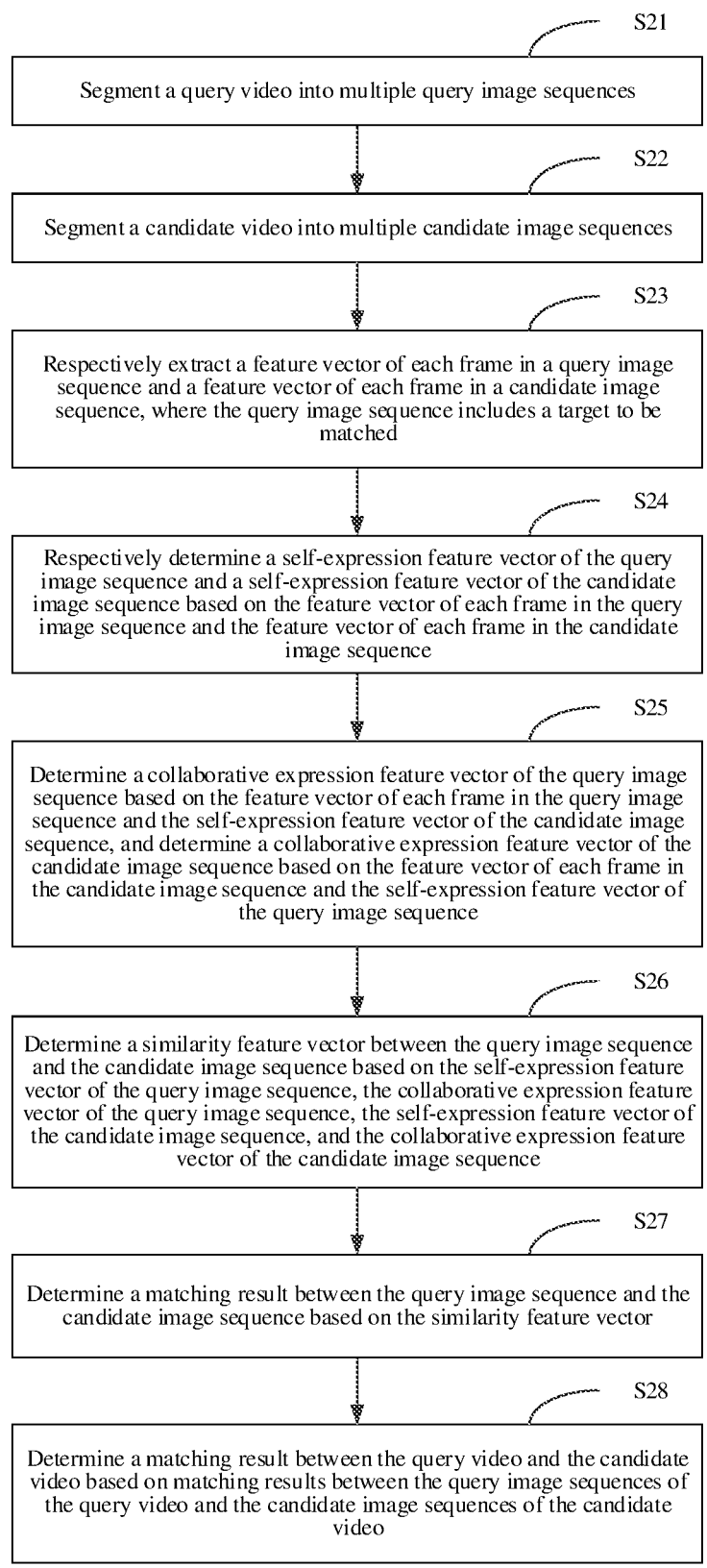
FIG. 14 is an exemplary flowchart of a target matching method according to embodiments of the present disclosure.

FIG. 14 is an exemplary flowchart of a target matching method according to embodiments of the present disclosure. As shown in FIG. 14, the method may include operations S21 to S28.

At operation S21, a query video is segmented into multiple query image sequences.

In a possible implementation, the segmenting a query video into multiple query image sequences includes: segmenting the query video into multiple query image sequences according to a preset sequence length and a preset step size, where the length of each query image sequence is equal to the preset sequence length, and the number of overlapping images between adjacent query image sequences is equal to the difference between the preset sequence length and the preset step size.

At operation S22, a candidate video is segmented into multiple candidate image sequences.

In a possible implementation, the segmenting a candidate video into multiple candidate image sequences includes: segmenting the candidate video into multiple candidate image sequences according to a preset sequence length and a preset step size, where the length of each candidate image sequence is equal to the preset sequence length, and the number of overlapping images between adjacent candidate image sequences is equal to the difference between the preset sequence length and the preset step size.

At operation S23, a feature vector of each frame in a query image sequence and a feature vector of each frame in a candidate image sequence are respectively extracted, where the query image sequence includes a target to be matched.

For operation S23, please refer to the description of operation S11 above.

At operation S24, a self-expression feature vector of the query image sequence and a self-expression feature vector of the candidate image sequence are respectively determined based on the feature vector of each frame in the query image sequence and the feature vector of each frame in the candidate image sequence.

For operation S24, please refer to the description of operation S12 above.

At operation S25, a collaborative expression feature vector of the query image sequence is determined based on the feature vector of each frame in the query image sequence and the self-expression feature vector of the candidate image sequence and a collaborative expression feature vector of the candidate image sequence is determined based on the feature vector of each frame in the candidate image sequence and the self-expression feature vector of the query image sequence.

For operation S25, please refer to the description of operation S13 above.

At operation S26, a similarity feature vector between the query image sequence and the candidate image sequence is determined based on the self-expression feature vector of the query image sequence, the collaborative expression feature vector of the query image sequence, the self-expression feature vector of the candidate image sequence, and the collaborative expression feature vector of the candidate image sequence.

For operation S26, please refer to the description of operation S14 above.

At operation S27, a matching result between the query image sequence and the candidate image sequence is determined based on the similarity feature vector.

For operation S27, please refer to the description of operation S15 above.

At operation S28, a matching result between the query video and the candidate video is determined based on matching results between the query image sequences of the query video and the candidate image sequences of the candidate video.

Figure 15:
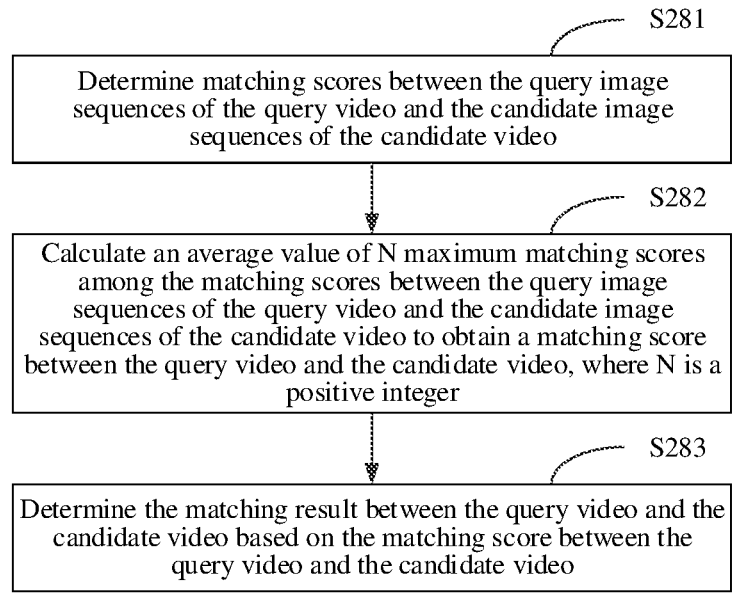
FIG. 15 is an exemplary flowchart of operation S28 in a target matching method according to embodiments of the present disclosure.

FIG. 15 is an exemplary flowchart of operation S28 in a target matching method according to embodiments of the present disclosure. As shown in FIG. 15, operation S28 may include operations S281 to S283.

At operation S281, matching scores between the query image sequences of the query video and the candidate image sequences of the candidate video are determined.

At operation S282, an average value of N maximum matching scores among the matching scores between the query image sequences of the query video and the candidate image sequences of the candidate video is calculated to obtain a matching score between the query video and the candidate video, where N is a positive integer.

At operation S283, the matching result between the query video and the candidate video is determined based on the matching score between the query video and the candidate video.

In a possible implementation, if the matching score between the query video and the candidate video is greater than a score threshold, it may be determined that the matching result between the query video and the candidate video is that the query video matches the candidate video; if the matching score between the query video and the candidate video is less than or equal to the score threshold, it may be determined that the matching result between the query video and the candidate video is that the query video does not match the candidate video.

According to the target matching method provided by the embodiments of the present disclosure, more discriminative key frames in image sequences can be filtered out, and the image sequences are expressed by multiple key frames, thereby improving the discrimination. The embodiments of the present disclosure provide a more effective time-domain modeling method, capturing the dynamic change information of consecutive frames and improving the expression capability of the model. The embodiments of the present disclosure provide a more effective distance measurement method, reducing the distance between feature expressions of the same person and increasing the distance between feature expressions of different persons. The target matching method provided by the embodiments of the present disclosure can still obtain accurate target matching results under the conditions of poor lighting conditions, severe occlusion, poor angle of view, or severe background interference. The use of the embodiments of the present disclosure can help improve the effects of human detection and/or pedestrian tracking. Utilizing the embodiments of the present disclosure, it is possible to perform better cross-camera search and tracking on specific pedestrians (such as criminal suspects, missing children, etc.) in intelligent video surveillance.

It may be understood that the foregoing method embodiments mentioned in the present disclosure may be combined with each other to obtain a combined embodiment without departing from the principle and the logic. Details are not described in the present disclosure due to space limitation.

In addition, the present disclosure further provides a target matching apparatus, an electronic device, a computer-readable storage medium, and a program, which can all be configured to implement any one of the target matching methods provided in the present disclosure. For the corresponding technical solutions and descriptions, please refer to the corresponding content in the method parts. Details are not described herein again.

Figure 16:
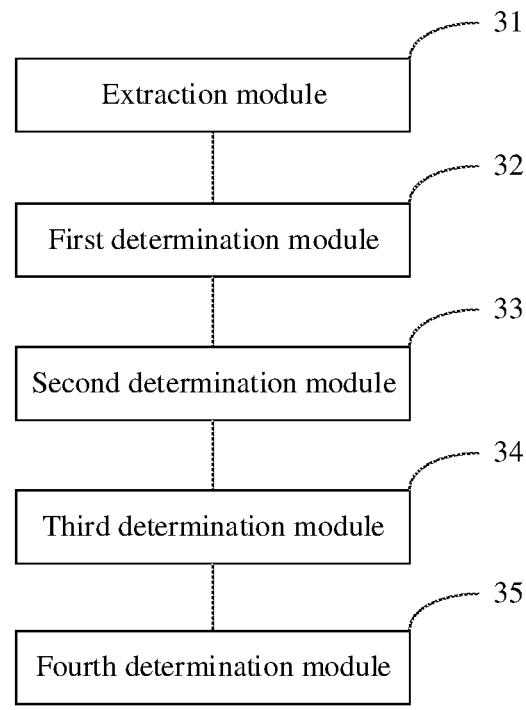
FIG. 16 is a block diagram of a target matching apparatus according to embodiments of the present disclosure.

FIG. 16 is a block diagram of a target matching apparatus according to embodiments of the present disclosure. As shown in FIG. 16, the apparatus includes: an extraction module 31, configured to respectively extract a feature vector of each frame in a query image sequence and a feature vector of each frame in a candidate image sequence, where the query image sequence includes a target to be matched; a first determination module 32, configured to determine a self-expression feature vector of the query image sequence based on the feature vector of each frame in the query image sequence, and determine a self-expression feature vector of the candidate image sequence based on the feature vector of each frame in the candidate image sequence; a second determination module 33, configured to determine a collaborative expression feature vector of the query image sequence based on the feature vector of each frame in the query image sequence and the self-expression feature vector of the candidate image sequence, and determine a collaborative expression feature vector of the candidate image sequence based on the feature vector of each frame in the candidate image sequence and the self-expression feature vector of the query image sequence; a third determination module 34, configured to determine a similarity feature vector between the query image sequence and the candidate image sequence based on the self-expression feature vector of the query image sequence, the collaborative expression feature vector of the query image sequence, the self-expression feature vector of the candidate image sequence, and the collaborative expression feature vector of the candidate image sequence; and a fourth determination module 35, configured to determine a matching result between the query image sequence and the candidate image sequence based on the similarity feature vector.

In a possible implementation, the extraction module 31 is configured to: extract the feature vector of each frame in the query image sequence and the feature vector of each frame in the candidate image sequence by a first sub-neural network.

Figure 17:
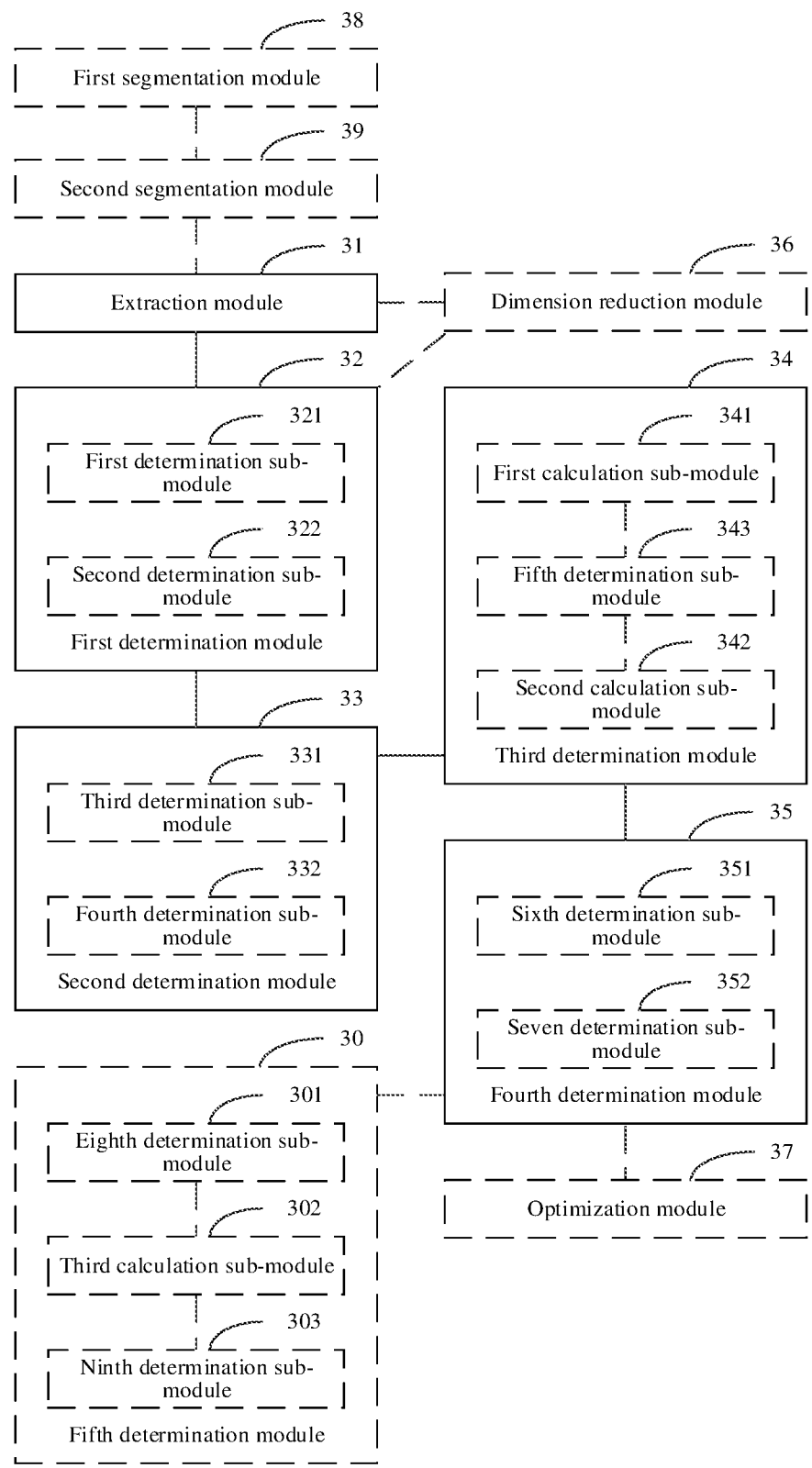
FIG. 17 is an exemplary block diagram of a target matching apparatus according to embodiments of the present disclosure.

FIG. 17 is an exemplary block diagram of a target matching apparatus according to embodiments of the present disclosure. As shown in FIG. 17:

in a possible implementation, the apparatus further includes: a dimension reduction module 36, configured to perform dimension reduction on the feature vector of each frame in the query image sequence and the feature vector of each frame in the candidate image sequence by a first fully connected layer of the first sub-neural network to obtain a first dimension-reduced feature vector of each frame in the query image sequence and a first dimension-reduced feature vector of each frame in the candidate image sequence.

In a possible implementation, the first determination module 32 includes: a first determination sub-module 321, configured to input the feature vector of each frame in the query image sequence and the first dimension-reduced feature vector of each frame in the query image sequence into a second sub-neural network to determine the self-expression feature vector of the query image sequence; and a second determination sub-module 322, configured to input the feature vector of each frame in the candidate image sequence and the first dimension-reduced feature vector of each frame in the candidate image sequence into the second sub-neural network to determine the self-expression feature vector of the candidate image sequence.

In a possible implementation, the first determination sub-module 321 includes: a first dimension reduction unit, configured to perform dimension reduction on the feature vector of each frame in the query image sequence by a second fully connected layer of the second sub-neural network to obtain a second dimension-reduced feature vector of each frame in the query image sequence; a first average pooling unit, configured to subject the second dimension-reduced feature vector of each frame in the query image sequence to average pooling in a time dimension to obtain a global feature vector of the query image sequence; and a first determination unit, configured to determine the self-expression feature vector of the query image sequence based on the second dimension-reduced feature vector of each frame in the query image sequence, the global feature vector of the query image sequence, and the first dimension-reduced feature vector of each frame in the query image sequence.

In a possible implementation, the second determination sub-module 322 includes: a second dimension reduction unit, configured to perform dimension reduction on the feature vector of each frame in the candidate image sequence by the second fully connected layer of the second sub-neural network to obtain a second dimension-reduced feature vector of each frame in the candidate image sequence; a second average pooling unit, configured to subject the second dimension-reduced feature vector of each frame in the candidate image sequence to average pooling in the time dimension to obtain a global feature vector of the candidate image sequence; and a second determination unit, configured to determine the self-expression feature vector of the candidate image sequence based on the second dimension-reduced feature vector of each frame in the candidate image sequence, the global feature vector of the candidate image sequence, and the first dimension-reduced feature vector of each frame in the candidate image sequence.

In a possible implementation, the first determination unit includes: a first calculation sub-unit, configured to calculate the correlation between the second dimension-reduced feature vector of each frame in the query image sequence and the global feature vector of the query image sequence through a parameter-less correlation function to obtain a first correlation weight of each frame in the query image sequence; and a first weighting sub-unit, configured to weight the first dimension-reduced feature vector of each frame in the query image sequence based on the first correlation weight of each frame in the query image sequence to obtain the self-expression feature vector of the query image sequence.

In a possible implementation, the second determination unit includes: a second calculation sub-unit, configured to calculate the correlation between the second dimension-reduced feature vector of each frame in the candidate image sequence and the global feature vector of the candidate image sequence through the parameter-less correlation function to obtain a first correlation weight of each frame in the candidate image sequence; and a second weighting sub-unit, configured to weight the first dimension-reduced feature vector of each frame in the candidate image sequence based on the first correlation weight of each frame in the candidate image sequence to obtain the self-expression feature vector of the candidate image sequence.

In a possible implementation, the first correlation weight includes a first normalized correlation weight, the first normalized correlation weight being obtained by normalizing the first correlation weight.

In a possible implementation, the second determination module 33 includes: a third determination sub-module 331, configured to input the feature vector of each frame in the query image sequence, the first dimension-reduced feature vector of each frame in the query image sequence, and the self-expression feature vector of the candidate image sequence into a third sub-neural network to obtain the collaborative expression feature vector of the query image sequence; and a fourth determination sub-module 332, configured to input the feature vector of each frame in the candidate image sequence, the first dimension-reduced feature vector of each frame in the candidate image sequence, and the self-expression feature vector of the query image sequence into the third sub-neural network to obtain the collaborative expression feature vector of the candidate image sequence.

In a possible implementation, the third determination sub-module 331 includes: a third dimension reduction unit, configured to perform dimension reduction on the feature vector of each frame in the query image sequence by a third fully connected layer of the third sub-neural network to obtain a third dimension-reduced feature vector of each frame in the query image sequence; and a third determination unit, configured to obtain the collaborative expression feature vector of the query image sequence based on the third dimension-reduced feature vector of each frame in the query image sequence, the self-expression feature vector of the candidate image sequence, and the first dimension-reduced feature vector of each frame in the query image sequence; the fourth determination sub-module 332 includes: a fourth dimension reduction unit, configured to perform dimension reduction on the feature vector of each frame in the candidate image sequence by the third fully connected layer of the third sub-neural network to obtain a third dimension-reduced feature vector of each frame in the candidate image sequence; and a fourth determination unit, configured to obtain the collaborative expression feature vector of the candidate image sequence based on the third dimension-reduced feature vector of each frame in the candidate image sequence, the self-expression feature vector of the query image sequence, and the first dimension-reduced feature vector of each frame in the candidate image sequence.

In a possible implementation, the third determination unit includes: a third calculation sub-unit, configured to calculate the correlation between the third dimension-reduced feature vector of each frame in the query image sequence and the self-expression feature vector of the candidate image sequence through the parameter-less correlation function to obtain a second correlation weight of each frame in the query image sequence; and a third weighting sub-unit, configured to weight the first dimension-reduced feature vector of each frame in the query image sequence based on the second correlation weight of each frame in the query image sequence to obtain the collaborative expression feature vector of the query image sequence.

In a possible implementation, the fourth determination unit includes: a fourth calculation sub-unit, configured to calculate the correlation between the third dimension-reduced feature vector of each frame in the candidate image sequence and the self-expression feature vector of the query image sequence through the parameter-less correlation function to obtain a second correlation weight of each frame in the candidate image sequence; and a fourth weighting sub-unit, configured to weight the first dimension-reduced feature vector of each frame in the candidate image sequence based on the second correlation weight of each frame in the candidate image sequence to obtain the collaborative expression feature vector of the candidate image sequence.

In a possible implementation, the second correlation weight includes a second normalized correlation weight, the second normalized correlation weight being obtained by normalizing the second correlation weight.

In a possible implementation, the third determination module 34 includes: a first calculation sub-module 341, configured to calculate a difference between the self-expression feature vector of the query image sequence and the collaborative expression feature vector of the candidate image sequence to obtain a first difference vector; a second calculation sub-module 342, configured to calculate a difference between the self-expression feature vector of the candidate image sequence and the collaborative expression feature vector of the query image sequence to obtain a second difference vector; and a fifth determination sub-module 343, configured to obtain the similarity feature vector between the query image sequence and the candidate image sequence based on the first difference vector and the second difference vector.

In a possible implementation, the fifth determination sub-module 343 includes: a first calculation unit, configured to calculate a sum of the first difference vector and the second difference vector to obtain the similarity feature vector between the query image sequence and the candidate image sequence; or, a second calculation unit, configured to calculate a product of elements of corresponding bits of the first difference vector and the second difference vector to obtain the similarity feature vector between the query image sequence and the candidate image sequence.

In a possible implementation, the fourth determination module 35 includes: a sixth determination sub-module 351, configured to input the similarity feature vector between the query image sequence and the candidate image sequence into a fourth fully connected layer to obtain a matching score between the query image sequence and the candidate image sequence; and a seventh determination sub-module 352, configured to determine the matching result between the query image sequence and the candidate image sequence based on the matching score between the query image sequence and the candidate image sequence.

In a possible implementation, the apparatus further includes: an optimization module 37, configured to optimize network parameters by using the same pair of labeled data and a binary cross-entropy loss function based on the matching score between the query image sequence and the candidate image sequence In a possible implementation, the apparatus further includes: a first segmentation module 38, configured to segment a query video into multiple query image sequences; a second segmentation module 39, configured to segment a candidate video into multiple candidate image sequences; and a fifth determination module 30, configured to determine a matching result between the query video and the candidate video based on matching results between the query image sequences of the query video and the candidate image sequences of the candidate video.

In a possible implementation, the first segmentation module 38 is configured to: segment the query video into multiple query image sequences according to a preset sequence length and a preset step size, where the length of each query image sequence is equal to the preset sequence length, and the number of overlapping images between adjacent query image sequences is equal to the difference between the preset sequence length and the preset step size; and the second segmentation module 39 is configured to: segment the candidate video into multiple candidate image sequences according to a preset sequence length and a preset step size, where the length of each candidate image sequence is equal to the preset sequence length, and the number of overlapping images between adjacent candidate image sequences is equal to the difference between the preset sequence length and the preset step size.

In a possible implementation, the fifth determination module 30 includes: an eighth determination sub-module 301, configured to determine matching scores between the query image sequences of the query video and the candidate image sequences of the candidate video; a third calculation sub-module 302, configured to calculate an average value of N maximum matching scores among the matching scores between the query image sequences of the query video and the candidate image sequences of the candidate video to obtain a matching score between the query video and the candidate video, where N is a positive integer; and a ninth determining sub-module 303, configured to determine the matching result between the query video and the candidate video based on the matching score between the query video and the candidate video.

In the embodiments of the present disclosure, by determining a similarity feature vector between a query image sequence and a candidate image sequence based on a self-expression feature vector of the query image sequence, a collaborative expression feature vector of the query image sequence, a self-expression feature vector of the candidate image sequence, and a collaborative expression feature vector of the candidate image sequence, and determining a matching result between the query image sequence and the candidate image sequence based on the similarity feature vector, the accuracy of target matching can be improved.

The embodiments of the present disclosure further provide a computer-readable storage medium having computer program instructions stored thereon, where the foregoing method is implemented when the computer program instructions are executed by a processor. The computer-readable storage medium may be a non-volatile computer-readable storage medium.

The embodiments of the present disclosure further provide an electronic device, including: a processor; and a memory configured to store processor-executable instructions, where the processor is configured to execute the foregoing methods.

The electronic device may be provided as a terminal, a server, or devices in other forms.

Figure 18:
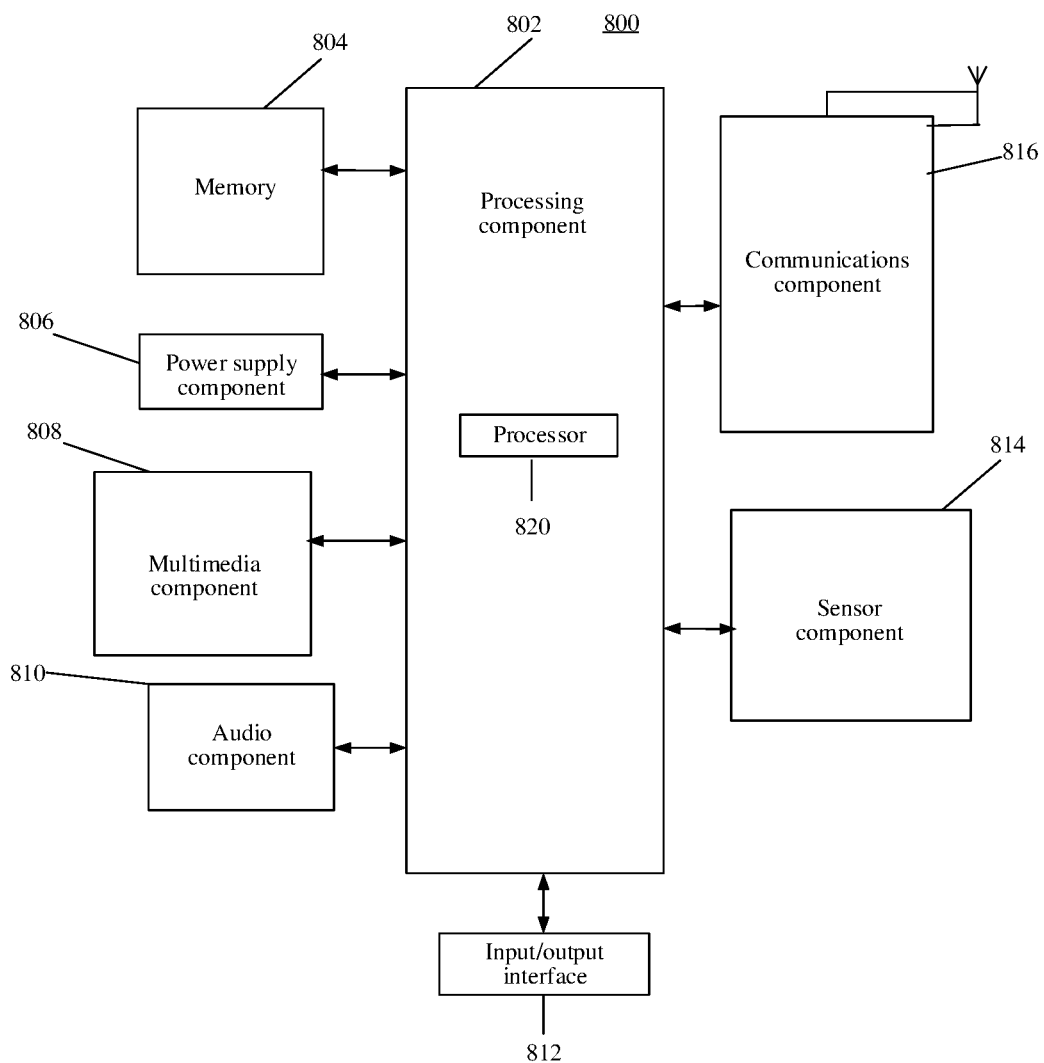
FIG. 18 is a block diagram of an electronic device 800 according to one or more exemplary embodiments of the present disclosure.

FIG. 18 is a block diagram of an electronic device 800 according to one exemplary embodiment. For example, the electronic device 800 may be a terminal such as a mobile phone, a computer, a digital broadcast terminal, a message transceiver device, a game console, a tablet device, a medical device, a fitness device, or a personal digital assistant.

Referring to FIG. 18, the electronic device 800 may include one or more of the following components: a processing component 802, a memory 804, a power supply component 806, a multimedia component 808, an audio component 810, an Input/Output (I/O) interface 812, a sensor component 814, and a communications component 816.

The processing component 802 usually controls the overall operation of the electronic device 800, such as operations associated with display, telephone call, data communication, a camera operation, or a recording operation. The processing component 802 may include one or more processors 820 to execute instructions, to complete all or some of the operations of the foregoing method. In addition, the processing component 802 may include one or more modules, for convenience of interaction between the processing component 802 and other components. For example, the processing component 802 may include a multimedia module, for convenience of interaction between the multimedia component 808 and the processing component 802.

The memory 804 is configured to store data of various types to support an operation on the electronic device 800. For example, the data includes instructions, contact data, phone book data, a message, an image, or a video of any application program or method that is operated on the electronic device 800. The memory 804 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power supply component 806 supplies power to various components of the electronic device 800. The power supply component 806 may include a power management system, one or more power supplies, and other components associated with power generation, management, and allocation for the electronic device 800.

The multimedia component 808 includes a screen that provides an output interface and is between the electronic device 800 and a user. In some embodiments, the screen may include a Liquid Crystal Display (LCD) and a Touch Panel (TP). If the screen includes the touch panel, the screen may be implemented as a touchscreen, to receive an input signal from the user. The touch panel includes one or more touch sensors to sense a touch, a slide, and a gesture on the touch panel. The touch sensor may not only sense a boundary of a touch operation or a slide operation, but also detect duration and pressure related to the touch operation or the slide operation. In some embodiments, the multimedia component 808 includes a front-facing camera and/or a rear-facing camera. When the electronic device 800 is in an operation mode, for example, a photographing mode or a video mode, the front-facing camera and/or the rear-facing camera may receive external multimedia data. Each front-facing camera or rear-facing camera may be a fixed optical lens system that has a focal length and an optical zoom capability.

The audio component 810 is configured to output and/or input an audio signal. For example, the audio component 810 includes one microphone (MIC). When the electronic device 800 is in an operation mode, such as a call mode, a recording mode, or a voice recognition mode, the microphone is configured to receive an external audio signal. The received audio signal may be further stored in the memory 804 or sent by using the communications component 816. In some embodiments, the audio component 810 further includes a speaker, configured to output an audio signal.

The I/O interface 812 provides an interface between the processing component 802 and a peripheral interface module, and the peripheral interface module may be a keyboard, a click wheel, a button, or the like. These buttons may include, but are not limited to, a home button, a volume button, a startup button, and a lock button.

The sensor component 814 includes one or more sensors, and is configured to provide status evaluation in various aspects for the electronic device 800. For example, the sensor component 814 may detect an on/off state of the electronic device 800 and relative positioning of components, and the components are, for example, a display and a keypad of the electronic device 800. The sensor component 814 may also detect a location change of the electronic device 800 or a component of the electronic device 800, existence or nonexistence of contact between the user and the electronic device 800, an orientation or acceleration/deceleration of the electronic device 800, and a temperature change of the electronic device 800. The sensor component 814 may include a proximity sensor, configured to detect existence of a nearby object when there is no physical contact. The sensor component 814 may further include an optical sensor, such as a CMOS or CCD image sensor, configured for use in imaging application. In some embodiments, the sensor component 814 may further include an acceleration sensor, a gyro sensor, a magnetic sensor, a pressure sensor, or a temperature sensor.

The communications component 816 is configured for wired or wireless communication between the electronic device 800 and other devices. The electronic device 800 may be connected to a communication-standard-based wireless network, such as Wi-Fi, 2G or 3G, or a combination thereof. In an exemplary embodiment, the communications component 816 receives a broadcast signal or broadcast-related information from an external broadcast management system through a broadcast channel. In an exemplary embodiment, the communications component 816 further includes a Near Field Communication (NFC) module, to facilitate short-range communication. For example, the NFC module is implemented based on a Radio Frequency Identification (RFID) technology, an Infrared Data Association (IrDA) technology, an Ultra Wideband (UWB) technology, a Bluetooth (BT) technology, and other technologies.

In an exemplary embodiment, the electronic device 800 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to perform the foregoing method.

In an exemplary embodiment, a non-volatile computer-readable storage medium, for example, the memory 804 including computer program instructions, is further provided. The computer program instructions may be executed by the processor 820 of the electronic device 800 to complete the foregoing method.

Figure 19:
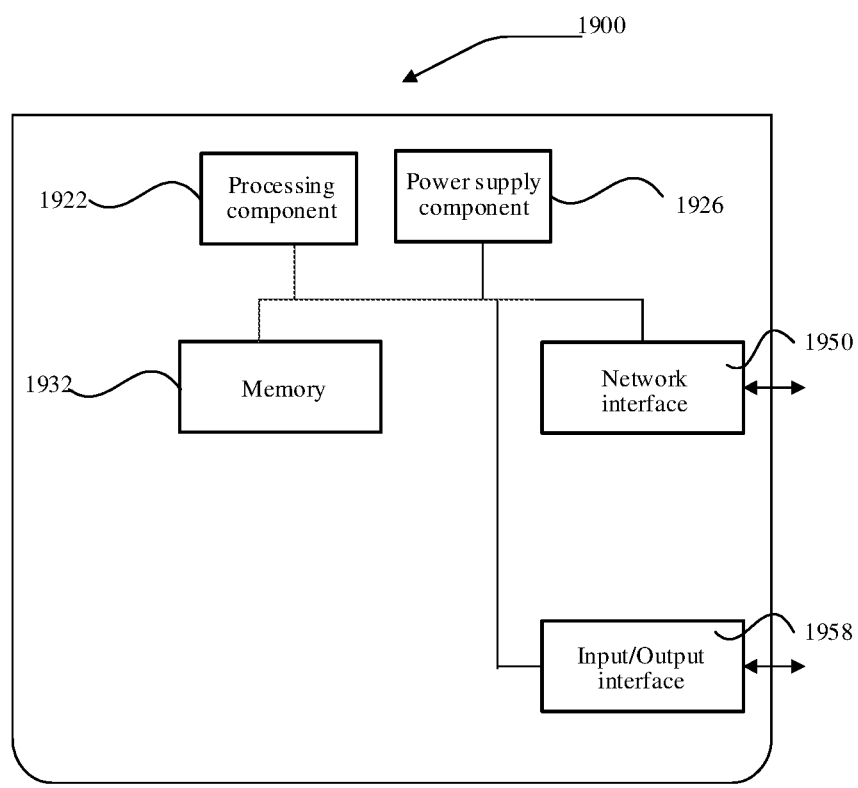
FIG. 19 is a block diagram of an electronic device 1900 according to one or more exemplary embodiments of the present disclosure.

FIG. 19 is a block diagram of an electronic device 1900 according to one exemplary embodiment. For example, the electronic device 1900 may be provided as a server. Referring to FIG. 19, the electronic device 1900 includes a processing component 1922 that further includes one or more processors; and a memory resource represented by a memory 1932, configured to store instructions, for example, an application program, that may be executed by the processing component 1922. The application program stored in the memory 1932 may include one or more modules each corresponding to a set of instructions. In addition, the processing component 1922 is configured to execute the instructions to perform the foregoing method.

The electronic device 1900 may further include: a power supply component 1926, configured to perform power management of the electronic device 1900; a wired or wireless network interface 1950, configured to connect the electronic device 1900 to a network; and an I/O interface 1958. The electronic device 1900 may operate an operating system stored in the memory 1932, such as Windows Server™, Mac OS X™, Unix™, Linux™, or FreeBSD™.

In an exemplary embodiment, a non-volatile computer-readable storage medium, for example, the memory 1932 including computer program instructions, is further provided. The computer program instructions may be executed by the processing component 1922 of the electronic device 1900 to complete the foregoing method.

The present disclosure may be a system, a method, and/or a computer program product. The computer program product may include a computer-readable storage medium, and computer-readable program instructions that are used by the processor to implement various aspects of the present disclosure are loaded on the computer-readable storage medium.

The computer-readable storage medium may be a tangible device that can maintain and store instructions used by an instruction execution device. The computer-readable storage medium may be, but is not limited to, an electronic storage device, a magnetic storage device, an optical storage device, an electromagnetic storage device, a semiconductor storage device, or any suitable combination of the above ones. More specific examples (a non-exhaustive list) of the computer readable storage medium include a portable computer disk, a hard disk, a Random Access Memory (RAM), an ROM, an EPROM or flash memory, an SRAM, a portable Compact Disc Read-Only Memory (CD-ROM), a Digital Versatile Disk (DVD), a memory stick, a floppy disk, a mechanical coding device such as a punched card storing instructions or a protrusion structure in a groove, and any appropriate combination thereof. The computer readable storage medium used here is not interpreted as an instantaneous signal such as a radio wave or another freely propagated electromagnetic wave, an electromagnetic wave propagated by a waveguide or another transmission medium (for example, an optical pulse transmitted by an optical fiber cable), or an electrical signal transmitted by a wire.

The computer readable program instructions described here may be downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter or a network interface in each computing/processing device receives the computer readable program instructions from the network, and forwards the computer readable program instructions, so that the computer readable program instructions are stored in a computer readable storage medium in each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The program readable program instructions may be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any kind of network, including a Local Area Network (LAN) or a Wide Area Network (WAN), or may be connected to an external computer (for example, connected via the Internet with the aid of an Internet service provider). In some embodiments, an electronic circuit such as a programmable logic circuit, an FPGA, or a Programmable Logic Array (PLA) is personalized by using status information of the computer readable program instructions, and the electronic circuit may execute the computer readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams may be implemented by using the computer readable program instructions.

These computer readable program instructions may be provided for a general-purpose computer, a dedicated computer, or a processor of another programmable data processing apparatus to generate a machine, so that when the instructions are executed by the computer or the processor of the another programmable data processing apparatus, an apparatus for implementing a specified function/action in one or more blocks in the flowcharts and/or block diagrams is generated. These computer readable program instructions may also be stored in a computer readable storage medium, and these instructions may instruct a computer, a programmable data processing apparatus, and/or another device to work in a specific manner. Therefore, the computer readable storage medium storing the instructions includes an artifact, and the artifact includes instructions for implementing a specified function/action in one or more blocks in the flowcharts and/or block diagrams.

The computer readable program instructions may be loaded onto a computer, another programmable data processing apparatus, or another device, so that a series of operations and operations are executed on the computer, the another programmable apparatus, or the another device, thereby generating computer-implemented processes. Therefore, the instructions executed on the computer, another programmable apparatus, or another device implement a specified function/action in one or more blocks in the flowcharts and/or block diagrams.

The flowcharts and block diagrams in the accompanying drawings show possible architectures, functions, and operations of the systems, methods, and computer program products in multiple embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system that executes a specified function or action, or may be implemented by using a combination of dedicated hardware and a computer instruction.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms used in the specification are intended to best explain the principles of the embodiments, practical applications, or technical improvements to the technologies in the market, or to enable others of ordinary skill in the art to understand the embodiments disclosed in the specification.

What is claimed is:

1. A target matching method, comprising:
respectively extracting a feature vector of each frame in a query image sequence and a feature vector of each frame in a candidate image sequence, wherein the query image sequence comprises a target to be matched;
determining a self-expression feature vector of the query image sequence based on the feature vector of each frame in the query image sequence, and determining a self-expression feature vector of the candidate image sequence based on the feature vector of each frame in the candidate image sequence;
determining a collaborative expression feature vector of the query image sequence based on the feature vector of each frame in the query image sequence and the self-expression feature vector of the candidate image sequence, and determining a collaborative expression feature vector of the candidate image sequence based on the feature vector of each frame in the candidate image sequence and the self-expression feature vector of the query image sequence;
determining a similarity feature vector between the query image sequence and the candidate image sequence based on the self-expression feature vector of the query image sequence, the collaborative expression feature vector of the query image sequence, the self-expression feature vector of the candidate image sequence, and the collaborative expression feature vector of the candidate image sequence; and
determining a matching result between the query image sequence and the candidate image sequence based on the similarity feature vector.

2. The method according to claim 1, wherein after the respectively extracting a feature vector of each frame in a query image sequence and a feature vector of each frame in a candidate image sequence, the method further comprises:
performing dimension reduction on the feature vector of each frame in the query image sequence and the feature vector of each frame in the candidate image sequence by a first fully connected layer of a first sub-neural network to obtain a first dimension-reduced feature vector of each frame in the query image sequence and a first dimension-reduced feature vector of each frame in the candidate image sequence.

3. The method according to claim 2, wherein the determining a self-expression feature vector of the query image sequence based on the feature vector of each frame in the query image sequence, and determining a self-expression feature vector of the candidate image sequence based on the feature vector of each frame in the candidate image sequence comprises:
inputting the feature vector of each frame in the query image sequence and the first dimension-reduced feature vector of each frame in the query image sequence into a second sub-neural network to determine the self-expression feature vector of the query image sequence; and
inputting the feature vector of each frame in the candidate image sequence and the first dimension-reduced feature vector of each frame in the candidate image sequence into the second sub-neural network to determine the self-expression feature vector of the candidate image sequence.

4. The method according to claim 3, wherein the inputting the feature vector of each frame in the query image sequence and the first dimension-reduced feature vector of each frame in the query image sequence into a second sub-neural network to determine the self-expression feature vector of the query image sequence comprises:
   performing dimension reduction on the feature vector of each frame in the query image sequence by a second fully connected layer of the second sub-neural network to obtain a second dimension-reduced feature vector of each frame in the query image sequence;
   subjecting the second dimension-reduced feature vector of each frame in the query image sequence to average pooling in a time dimension to obtain a global feature vector of the query image sequence; and
   determining the self-expression feature vector of the query image sequence based on the second dimension-reduced feature vector of each frame in the query image sequence, the global feature vector of the query image sequence, and the first dimension-reduced feature vector of each frame in the query image sequence.

5. The method according to claim 4, wherein the determining the self-expression feature vector of the query image sequence based on the second dimension-reduced feature vector of each frame in the query image sequence, the global feature vector of the query image sequence, and the first dimension-reduced feature vector of each frame in the query image sequence comprises:
   calculating a correlation between the second dimension-reduced feature vector of each frame in the query image sequence and the global feature vector of the query image sequence through a parameter-less correlation function to obtain a first correlation weight of each frame in the query image sequence; and
   weighting the first dimension-reduced feature vector of each frame in the query image sequence based on the first correlation weight of each frame in the query image sequence to obtain the self-expression feature vector of the query image sequence.

6. The method according to claim 3, wherein the inputting the feature vector of each frame in the candidate image sequence and the first dimension-reduced feature vector of each frame in the candidate image sequence into the second sub-neural network to obtain the self-expression feature vector of the candidate image sequence comprises:
   performing dimension reduction on the feature vector of each frame in the candidate image sequence by a second fully connected layer of the second sub-neural network to obtain a second dimension-reduced feature vector of each frame in the candidate image sequence;
   subjecting the second dimension-reduced feature vector of each frame in the candidate image sequence to average pooling in a time dimension to obtain a global feature vector of the candidate image sequence; and
   determining the self-expression feature vector of the candidate image sequence based on the second dimension-reduced feature vector of each frame in the candidate image sequence, the global feature vector of the candidate image sequence, and the first dimension-reduced feature vector of each frame in the candidate image sequence.

7. The method according to claim 6, wherein the determining the self-expression feature vector of the candidate image sequence based on the second dimension-reduced feature vector of each frame in the candidate image sequence, the global feature vector of the candidate image sequence, and the first dimension-reduced feature vector of each frame in the candidate image sequence comprises:
   calculating a correlation between the second dimension-reduced feature vector of each frame in the candidate image sequence and the global feature vector of the candidate image sequence through a parameter-less correlation function to obtain a first correlation weight of each frame in the candidate image sequence; and
   weighting the first dimension-reduced feature vector of each frame in the candidate image sequence based on the first correlation weight of each frame in the candidate image sequence to obtain the self-expression feature vector of the candidate image sequence.

8. The method according to claim 2, wherein the determining a collaborative expression feature vector of the query image sequence based on the feature vector of each frame in the query image sequence and the self-expression feature vector of the candidate image sequence, and determining a collaborative expression feature vector of the candidate image sequence based on the feature vector of each frame in the candidate image sequence and the self-expression feature vector of the query image sequence comprises:
   inputting the feature vector of each frame in the query image sequence, the first dimension-reduced feature vector of each frame in the query image sequence, and the self-expression feature vector of the candidate image sequence into a third sub-neural network to obtain the collaborative expression feature vector of the query image sequence; and
   inputting the feature vector of each frame in the candidate image sequence, the first dimension-reduced feature vector of each frame in the candidate image sequence, and the self-expression feature vector of the query image sequence into the third sub-neural network to obtain the collaborative expression feature vector of the candidate image sequence.

9. The method according to claim 8, wherein the inputting the feature vector of each frame in the query image sequence, the first dimension-reduced feature vector of each frame in the query image sequence, and the self-expression feature vector of the candidate image sequence into a third sub-neural network to obtain the collaborative expression feature vector of the query image sequence comprises:
   performing dimension reduction on the feature vector of each frame in the query image sequence by a third fully connected layer of the third sub-neural network to obtain a third dimension-reduced feature vector of each frame in the query image sequence; and
   obtaining the collaborative expression feature vector of the query image sequence based on the third dimension-reduced feature vector of each frame in the query image sequence, the self-expression feature vector of the candidate image sequence, and the first dimension-reduced feature vector of each frame in the query image sequence;
   the inputting the feature vector of each frame in the candidate image sequence, the first dimension-reduced feature vector of each frame in the candidate image sequence, and the self-expression feature vector of the query image sequence into the third sub-neural network to obtain the collaborative expression feature vector of the candidate image sequence comprises:
   performing dimension reduction on the feature vector of each frame in the candidate image sequence by the third fully connected layer of the third sub-neural network to obtain a third dimension-reduced feature vector of each frame in the candidate image sequence; and obtaining the collaborative expression feature vector of the candidate image sequence based on the third dimension-reduced feature vector of each frame in the candidate image sequence, the self-expression feature vector of the query image sequence, and the first dimension-reduced feature vector of each frame in the candidate image sequence.

10. The method according to claim 9, wherein the obtaining the collaborative expression feature vector of the query image sequence based on the third dimension-reduced feature vector of each frame in the query image sequence, the self-expression feature vector of the candidate image sequence, and the first dimension-reduced feature vector of each frame in the query image sequence comprises:

calculating a correlation between the third dimension-reduced feature vector of each frame in the query image sequence and the self-expression feature vector of the candidate image sequence through a parameter-less correlation function to obtain a second correlation weight of each frame in the query image sequence; and weighting the first dimension-reduced feature vector of each frame in the query image sequence based on the second correlation weight of each frame in the query image sequence to obtain the collaborative expression feature vector of the query image sequence.

11. The method according to claim 9, wherein the obtaining the collaborative expression feature vector of the candidate image sequence based on the third dimension-reduced feature vector of each frame in the candidate image sequence, the self-expression feature vector of the query image sequence, and the first dimension-reduced feature vector of each frame in the candidate image sequence comprises:

calculating a correlation between the third dimension-reduced feature vector of each frame in the candidate image sequence and the self-expression feature vector of the query image sequence through a parameter-less correlation function to obtain a second correlation weight of each frame in the candidate image sequence; and weighting the first dimension-reduced feature vector of each frame in the candidate image sequence based on the second correlation weight of each frame in the candidate image sequence to obtain the collaborative expression feature vector of the candidate image sequence.

12. The method according to claim 1, wherein the determining a similarity feature vector between the query image sequence and the candidate image sequence based on the self-expression feature vector of the query image sequence, the collaborative expression feature vector of the query image sequence, the self-expression feature vector of the candidate image sequence, and the collaborative expression feature vector of the candidate image sequence comprises:

calculating a difference between the self-expression feature vector of the query image sequence and the collaborative expression feature vector of the candidate image sequence to obtain a first difference vector;

calculating a difference between the self-expression feature vector of the candidate image sequence and the collaborative expression feature vector of the query image sequence to obtain a second difference vector; and obtaining the similarity feature vector between the query image sequence and the candidate image sequence based on the first difference vector and the second difference vector.

13. The method according to claim 12, wherein the obtaining the similarity feature vector between the query image sequence and the candidate image sequence based on the first difference vector and the second difference vector comprises:

calculating a sum of the first difference vector and the second difference vector to obtain the similarity feature vector between the query image sequence and the candidate image sequence; or, calculating a vector product of elements of corresponding bits of the first difference vector and the second difference vector to obtain the similarity feature vector between the query image sequence and the candidate image sequence.

14. The method according to claim 1, wherein the determining a matching result between the query image sequence and the candidate image sequence based on the similarity feature vector comprises:

inputting the similarity feature vector between the query image sequence and the candidate image sequence into a fourth fully connected layer to obtain a matching score between the query image sequence and the candidate image sequence; and determining the matching result between the query image sequence and the candidate image sequence based on the matching score between the query image sequence and the candidate image sequence.

15. The method according to claim 14, wherein after the obtaining a matching score between the query image sequence and the candidate image sequence, the method further comprises:

optimizing, based on the matching score between the query image sequence and the candidate image sequence, network parameters by using a same pair of labeled data and a binary cross-entropy loss function.

16. The method according to claim 1, wherein before the respectively extracting a feature vector of each frame in a query image sequence and a feature vector of each frame in a candidate image sequence, the method further comprises:

segmenting a query video into multiple query image sequences; and segmenting a candidate video into multiple candidate image sequences;

after the determining a matching result between the query image sequence and the candidate image sequence based on the similarity feature vector, the method further comprises:

determining a matching result between the query video and the candidate video based on matching results between the multiple query image sequences and the multiple candidate image sequences.

17. The method according to claim 16, wherein the segmenting a query video into multiple query image sequences comprises:

segmenting the query video into the multiple query image sequences according to a preset sequence length and a preset step size, wherein a length of each of the multiple query image sequences is equal to the preset sequence length, and a number of overlapping images between adjacent query image sequences is equal to a difference between the preset sequence length and the preset step size;

the segmenting a candidate video into multiple candidate image sequences comprises:

segmenting the candidate video into the multiple candidate image sequences according to a preset sequence length and a preset step size, wherein a length of each of the multiple candidate image sequence is equal to the preset sequence length, and a number of overlapping images between adjacent candidate image sequences is equal to the difference between the preset sequence length and the preset step size.

18. The method according to claim 16, wherein the determining a matching result between the query video and the candidate video based on matching results between the multiple query image sequences and the multiple candidate image sequences comprises:

determining matching scores, each being a matching score between each of the multiple query image sequences and a respective one of the multiple candidate image sequences of the candidate video;

calculating an average value of top N matching scores among the matching scores to obtain a matching score between the query video and the candidate video, wherein N is a positive integer; and determining the matching result between the query video and the candidate video based on the matching score between the query video and the candidate video.

19. A non-transitory electronic device, comprising:

a processor; and a memory configured to store processor-executable instructions;

wherein when the processor-executable instructions are executed by the processor, the processor is configured to:

respectively extract a feature vector of each frame in a query image sequence and a feature vector of each frame in a candidate image sequence, wherein the query image sequence comprises a target to be matched;

determine a self-expression feature vector of the query image sequence based on the feature vector of each frame in the query image sequence, and determine a self-expression feature vector of the candidate image sequence based on the feature vector of each frame in the candidate image sequence;

determine a collaborative expression feature vector of the query image sequence based on the feature vector of each frame in the query image sequence and the self-expression feature vector of the candidate image sequence, and determine a collaborative expression feature vector of the candidate image sequence based on the feature vector of each frame in the candidate image sequence and the self-expression feature vector of the query image sequence;

determine a similarity feature vector between the query image sequence and the candidate image sequence based on the self-expression feature vector of the query image sequence, the collaborative expression feature vector of the query image sequence, the self-expression feature vector of the candidate image sequence, and the collaborative expression feature vector of the candidate image sequence; and determine a matching result between the query image sequence and the candidate image sequence based on the similarity feature vector.

20. A non-transitory computer-readable storage medium, having computer program instructions stored thereon, wherein when the computer program instructions are executed by a processor, the following operations are performed:

respectively extracting a feature vector of each frame in a query image sequence and a feature vector of each frame in a candidate image sequence, wherein the query image sequence comprises a target to be matched;

determining a self-expression feature vector of the query image sequence based on the feature vector of each frame in the query image sequence, and determining a self-expression feature vector of the candidate image sequence based on the feature vector of each frame in the candidate image sequence;

determining a collaborative expression feature vector of the query image sequence based on the feature vector of each frame in the query image sequence and the self-expression feature vector of the candidate image sequence, and determining a collaborative expression feature vector of the candidate image sequence based on the feature vector of each frame in the candidate image sequence and the self-expression feature vector of the query image sequence;

determining a similarity feature vector between the query image sequence and the candidate image sequence based on the self-expression feature vector of the query image sequence, the collaborative expression feature vector of the query image sequence, the self-expression feature vector of the candidate image sequence, and the collaborative expression feature vector of the candidate image sequence; and determining a matching result between the query image sequence and the candidate image sequence based on the similarity feature vector.

* * * * *